US009988511B2

(12) United States Patent
Terasaki et al.

(10) Patent No.: US 9,988,511 B2
(45) Date of Patent: Jun. 5, 2018

(54) COMPOSITE RESIN PARTICLES, FOAMABLE PARTICLES, PRE-FOAMED PARTICLES, AND FOAM MOLDED BODY

(71) Applicant: SEKISUI PLASTICS CO., LTD., Osaka (JP)

(72) Inventors: Shingo Terasaki, Shiga (JP); Yushi Sakakibara, Shiga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 0 days. days.

(21) Appl. No.: 15/113,227

(22) PCT Filed: Mar. 10, 2015

(86) PCT No.: PCT/JP2015/057047

§ 371 (c)(1),
(2) Date: Jul. 21, 2016

(87) PCT Pub. No.: WO2015/137353

PCT Pub. Date: Sep. 17, 2015

(65) Prior Publication Data

US 2017/0002163 A1 Jan. 5, 2017

(30) Foreign Application Priority Data

Mar. 12, 2014 (JP) ................................ 2014-049099
Mar. 12, 2014 (JP) ................................ 2014-049103

(51) Int. Cl.

| | |
|---|---|
| ***C08F 255/02*** | (2006.01) |
| ***C08J 9/00*** | (2006.01) |
| ***C08J 9/18*** | (2006.01) |
| ***C08J 9/232*** | (2006.01) |
| ***C08J 9/14*** | (2006.01) |
| ***C08L 23/06*** | (2006.01) |
| ***C08J 9/228*** | (2006.01) |

(52) U.S. Cl.

CPC ........... *C08J 9/0061* (2013.01); *C08F 255/02* (2013.01); *C08J 9/0023* (2013.01); *C08J 9/0028* (2013.01); *C08J 9/0066* (2013.01); *C08J 9/0095* (2013.01); *C08J 9/141* (2013.01); *C08J 9/18* (2013.01); *C08J 9/228* (2013.01); *C08J 9/232* (2013.01); *C08L 23/06* (2013.01); *C08J 2201/034* (2013.01); *C08J 2203/14* (2013.01); *C08J 2203/182* (2013.01); *C08J 2325/06* (2013.01); *C08J 2423/06* (2013.01); *C08J 2423/08* (2013.01)

(58) Field of Classification Search

CPC ............... C08J 2203/14; C08J 2325/06; C08J 2423/06; C08J 2423/08; C08J 9/0023; C08J 9/0028; C08J 9/0061; C08J 9/0066; C08J 9/0095; C08J 9/141; C08J 9/18; C08J 9/232; C08J 9/228; C08J 2201/034; C08F 255/02; C08L 23/06; C08L 23/0815

See application file for complete search history.

(56) References Cited

U.S. PATENT DOCUMENTS

| | | | | |
|---|---|---|---|---|
| 3,520,834 | A * | 7/1970 | Mizutani et al. | C08J 9/0061 264/211 |
| 2006/0058406 | A1* | 3/2006 | Matsumura et al. | C08F 255/02 521/142 |
| 2006/0063847 | A1 | 3/2006 | Matsumura et al. | |
| 2009/0186954 | A1 | 7/2009 | Okamura et al. | |
| 2013/0338246 | A1* | 12/2013 | Yoshida | C08K 13/02 521/93 |

FOREIGN PATENT DOCUMENTS

| | | | |
|---|---|---|---|
| EP | 3124521 | A1 | 1/2017 |
| JP | 47-35057 | | 11/1972 |
| JP | 57-197119 | A | 12/1982 |
| JP | 04-220439 | A | 8/1992 |
| JP | 2001-002820 | A | 1/2001 |
| JP | 2007-270116 | A | 10/2007 |
| JP | 4072553 | B2 | 4/2008 |
| JP | 4072554 | B2 | 4/2008 |
| JP | 2010-24353 | A | 2/2010 |
| JP | 2012025347 | A | 2/2012 |
| JP | 2012-197373 | A | 10/2012 |
| JP | 2013204014 | A | 10/2013 |
| WO | 2007/138916 | A1 | 12/2007 |
| WO | 2009/157374 | A1 | 12/2009 |

OTHER PUBLICATIONS

International Search Report issued with respect to Application No. PCT/JP2015/057047, dated Jun. 9, 2015.
International Preliminary Report on Patentability issued with respect to Application No. PCT/JP2015/057047, dated Sep. 13, 2016.

* cited by examiner

*Primary Examiner* — Nathan M Nutter
(74) *Attorney, Agent, or Firm* — Greenblum & Bernstein, P.L.C.

(57) ABSTRACT

Composite resin particles including: a polyethylene-based resin and a polystyrene-based resin, wherein the polyethylene-based resin and the polystyrene-based resin are included in the ranges of 50 to 20% by mass and 50 to 80% by mass respectively, with respect to the total of these resins, the polyethylene-based resin is composed of: a first polyethylene-based resin having a medium density to a high density in the range of 925 to 965 kg/m$^3$; and a second polyethylene-based resin which is linear and which has a lower density than the first polyethylene-based resin, and the first polyethylene-based resin and the second polyethylene-based resin are included in the ranges of 90 to 30% by mass and 10 to 70% by mass respectively, with respect to the total of these resins.

18 Claims, 3 Drawing Sheets

COMPOSITE RESIN PARTICLES, FOAMABLE PARTICLES, PRE-FOAMED PARTICLES, AND FOAM MOLDED BODY

TECHNICAL FIELD

The present invention relates to composite resin particles, foamable(expandable) particles, pre-foamed(pre-expanded) particles, and an foam(expanded) molded body(article). More specifically, the present invention relates to composite resin particles, expandable particles, and pre-expanded particles that can give an expanded molded article for which the falling ball impact value is improved and for which the temperature dependency of various physical properties such as mechanical properties (falling impact resistance compressibility, falling impact resistance, and the like) is suppressed, and to an expanded molded article obtained from these particles.

BACKGROUND TECHNOLOGY

It is known that an expanded molded article formed from a polystyrene-based resin has superior rigidity, thermal insulation properties, lightweight properties, water resistance, and expansion moldability. For this reason, this expanded molded article is used widely as a cushioning material and as a thermal insulating material for building materials. However, an expanded molded article formed from a polystyrene-based resin had the problem that chemical resistance and impact resistance are inferior.

On the other hand, it is known that an expanded molded article formed from a polyethylene-based resin has superior chemical resistance and impact resistance. For this reason, this expanded molded article is used in vehicle-related components. However, since retention of the blowing agent is inferior for a polyethylene-based resin, it is necessary to closely control the expansion molding conditions. For this reason, there was the problem that production costs are high. In addition, there was also the problem that the rigidity of this expanded molded article is inferior compared to an expanded molded article formed from a polystyrene-based resin.

In order to solve the above-mentioned problems of expanded molded articles formed from a polystyrene-based resin or a polyethylene-based resin, an expanded molded article obtained from composite resin particles of a polystyrene-based resin and a polyethylene-based resin has been reported. This expanded molded article has both the superior rigidity and expansion moldability of a polystyrene-based resin and the superior chemical resistance and impact resistance of a polyethylene -based resin. Furthermore, in Japanese Patent No. 4072553 (Patent Document 1) and Japanese Patent No. 4072554(Patent Document 2), it is reported that composite resin particles including a linear low-density polyethylene-based resin give an expanded molded article having further improved impact resistance. Also, in Japanese Unexamined Patent Application, First Publication No. 2007-270116 (Patent Document 3) and Japanese Unexamined Patent Application, First Publication No. 2010-24353 (Patent Document 4), it is reported that composite resin particles including a high-density polyethylene-based resin having specific physical properties give an expanded molded article for which the temperature dependency of mechanical properties is suppressed.

PRIOR ART DOCUMENTS

Patent Documents

Patent Document 1: Japanese Patent No. 4072553

Patent Document 2: Japanese Patent No. 4072554

Patent Document 3: Japanese Unexamined Patent Application, First Publication No. 2007-270118

Patent Document 4: Japanese Unexamined Patent Application, First Publication No. 2010-24353

SUMMARY OF THE INVENTION

Problem to Be Solved By the Invention

An expanded molded article having high mechanical properties or improved impact resistance can be provided by the composite resin particles disclosed in the aforementioned publications. However, the provision of composite resin particles that can further improve the impact resistance of an expanded molded article over a wide temperature range is desired.

Means for Solving Problem

The inventors of the present invention, as a result of reconsidering the raw materials of expanded molded articles, unexpectedly found that the impact resistance of an expanded molded article can be further improved in a wide temperature range by including a medium-density to high-density polyethylene and a linear low-density polyethylene in specific ratios in composite resin particles, thus leading to completion of the present invention.

That is, in accordance with the present invention, composite resin particles including: a polyethylene-based resin and a polystyrene-based resin, wherein the polyethylene-based resin and the polystyrene-based resin are included in the ranges of 50 to 20% by mass and 50 to 80% by mass respectively, with respect to the total of these resins, the polyethylene-based resin is composed of: a first polyethylene-based resin having a medium density to a high density in the range of 925 to 965 kg/$m^3$; and a second polyethylene-based resin which is linear and which has a lower density than the first polyethylene-based resin, and the first polyethylene-based resin and the second polyethylene-based resin are included in the ranges of 90 to 30% by mass and 10 to 70% by mass respectively, with respect to the total of these resins.

Furthermore, in accordance with the present invention, expandable particles including the aforementioned composite resin particles and a physical blowing agent are provided.

Also, in accordance with the present invention, pre-expanded particles obtained by pre-expanding the aforementioned expandable particles are provided.

Moreover, an expanded molded article obtained by in-die expansion molding the aforementioned pre-expanded particles is provided.

Effects of the Invention

In accordance with the present invention, composite resin particles, expandable particles, and pre-expanded particles which can give an expanded molded article for which variation in mechanical properties (for example, falling impact resistance compressibility and falling impact resistance) in a range from low temperature to high temperature (for example, −35 to 65° C.) is suppressed and impact resistance is improved can be provided. Also, an expanded molded article obtained from these particles for which variation in mechanical properties is suppressed and impact resistance is improved can be provided.

Furthermore, in any of the following cases, the present invention can provide composite resin particles which can give an expanded molded article for which variation in mechanical properties is further suppressed and impact resistance is further improved.

(1) The second polyethylene-based resin has a density of 15 $kg/m^3$ or more lower than the first polyethylene-based resin.

(2) The first polyethylene-based resin has a crystallization calorific value of 140mJ/mg or more, and the second polyethylene-based resin has a crystallization calorific value of 120 mJ/mg or less.

(3) The composite resin particles are particles in which the gel fraction has been suppressed to less than 5% by weight.

(4) The composite resin particles have an average particle diameter of 1.0 to 2.0mm.

(5) The first polyethylene-based resin is provided with two or more peaks in an elution temperature-elution amount curve by continuous temperature rising elution fractionation (TREF).

(6) The composite resin particles further include carbon black in the range of 0.5 to 2.5% by mass.

(7) The composite resin particles are obtained by impregnating a styrene-based monomer in seed particles formed from a polyethylene-based resin and polymerizing.

(8) Composite resin particles including: a polyethylene-based resin and a polystyrene-based resin, wherein the polyethylene-based resin and the polystyrene-based resin are included in the ranges of 50 to 20% by mass and 50 to 80% by mass respectively, with respect to the total of these resins, the polyethylene-based resin is composed of a first polyethylene-based resin having a medium density to a high density in the range of 930 to 950 $kg/m^3$; and a second polyethylene-based resin which is linear and which has a lower density than the first polyethylene-based resin, the first polyethylene-based resin and the second polyethylene-based resin are included in the ranges of 90 to 30% by mass and 10 to 70% by mass respectively, with respect to the total of these resins, and the first polyethylene-based resin, in terms of polystyrene, has a number-average molecular weight Mn in the range of 25,000 to 50,000, a Z-average molecular weight Mz in the range of 700,000 to 1,300,000, and Mz/Mn in the range of 20 to 50 by GPC measurement.

(9) The first polyethylene-based resin, in terms of polystyrene, has a weight-average molecular weight Mw in the range of 150,000 to 250,000, and Mw/Mn in the range of 4.5 to 9.0 by GPC measurement.

(10) The polystyrene-based resin has a Z-average molecular weight Mz in the range of 600,000 to 1,000,000 by GPC measurement.

(11) The polystyrene-based resin has a weight-average molecular weight Mw in the range of 250,000 to 450,000 by GPC measurement.

Moreover, in any of the following cases, the present invention can provide pre-expanded particles which can give an expanded molded article for which variation of mechanical properties is further suppressed and for which impact resistance is further improved.

(1) The polystyrene-based resin has a Z-average molecular weight Mz in the range of 600,000 to 1,000,000 by GPC measurement.

(2) The polystyrene-based resin has a weight-average molecular weight Mw in the range of 250,000 to 450,000 by GPC measurement.

Figure 1:
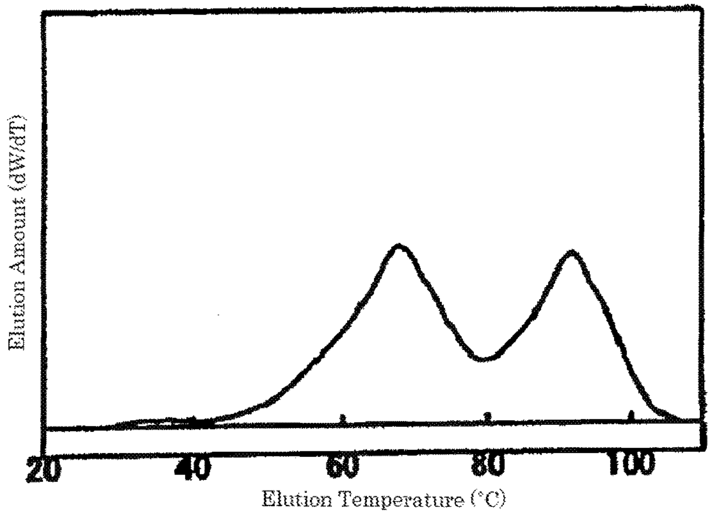
FIG. 1 is a representative TREF elution temperature-elution amount curve of polyethylene-based resins that can be used in the present invention.
Figure 2:
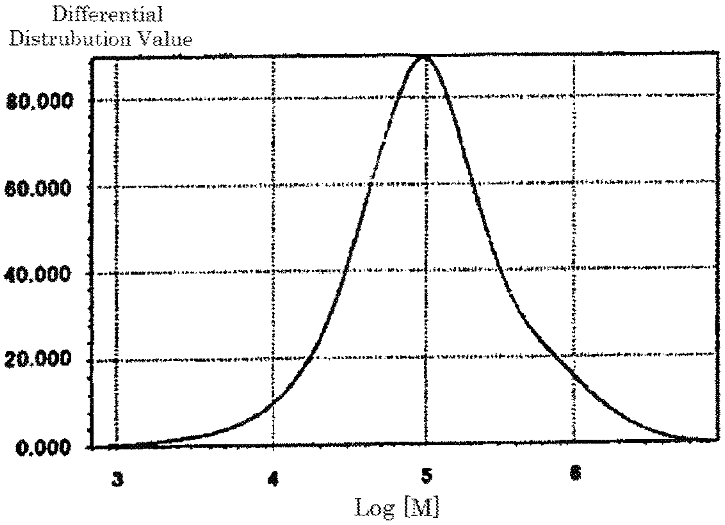
FIG. 2 is a molecular weight distribution curve of the first polyethylene-based resin used in Examples 7a and 3b.
Figure 3:
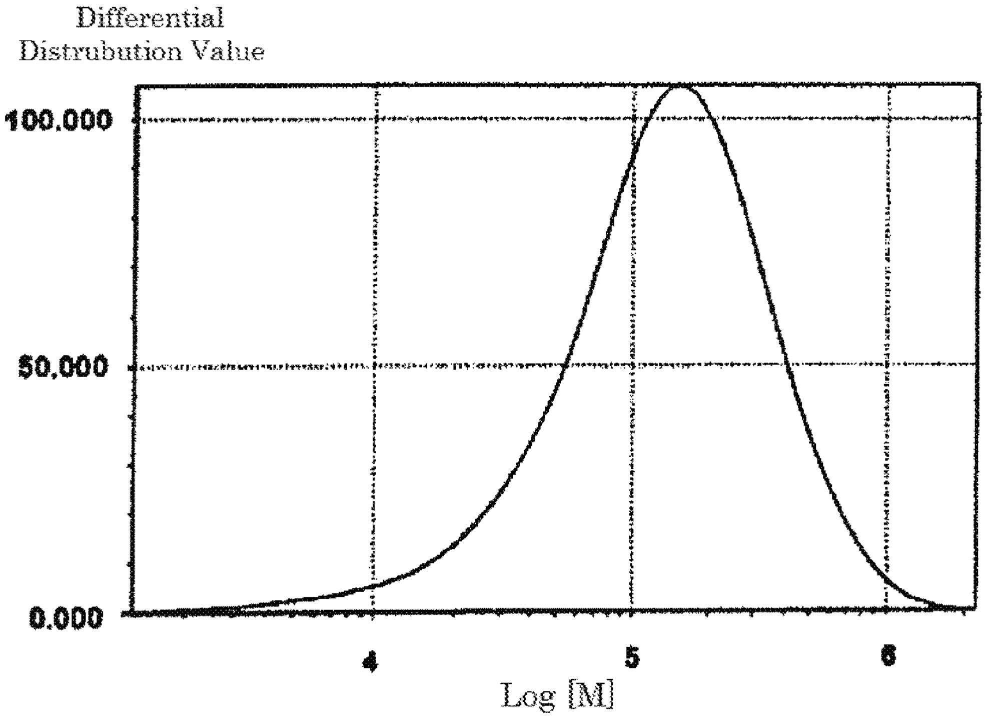
FIG. 3 is a molecular weight distribution curve of the second polyethylene-based resin used in Examples 7a and 3b.

BEST MODE FOR CARRYING OUT THE INVENTION (Composite Resin Particles)

The composite resin particles of the present invention include a polyethylene-based resin and a polystyrene-based resin.

The method for compounding the polyethylene-based resin and the polystyrene-based resin is not particularly limited, and publicly-known methods can be variously used. For example, a method in which the polyethylene-based resin and the polystyrene-based resin are kneaded, and a method in which a styrene-based monomer is impregnated into polyethylene-based resin particles and polymerized can be mentioned.

(1) Polyethylene-Based Resin

The polyethylene-based resin is composed of a first polyethylene-based resin having a medium density to a high density in the range of 925 to 965 $kg/m^3$ and a second polyethylene-based resin which is linear and which has a lower density than the first polyethylene-based resin, (a) First Polyethylene-Based Resin The first polyethylene-based resin has a density in the range of 925 to 965 $kg/m^3$. In general, this density range is considered to be from medium density to high density in polyethylene-based resins. A polyethylene-based resin having such density has the characteristic that the temperature dependency of mechanical properties is smaller than other polyethylene-based resins. Specifically, mechanical properties do not deteriorate easily even at a low temperature of −35° C., and thus an expanded molded article having superior cold resistance can be provided, and moreover, since the melting point and the Vicat softening point are higher than other polyethylene-based resins, mechanical properties do not deteriorate easily even at a high temperature of 65° C., and thus an expanded molded article having superior thermal resistance can be provided. If the density is smaller than 925 $kg/m^3$, thermal resistance may become insufficient. If the density is larger than 965 $kg/m^3$, the melting point becomes too high, and expansion and molding may become difficult. If the density is 930 $kg/m^3$ or more, it is possible to suppress the thermal resistance from becoming insufficient. If the density is 950 $kg/m^3$ or less, it is possible to suppress the melting point from becoming too high and expansion and molding from being difficult.

The density can be 925 $kg/m^3$, 930 $kg/m^3$, 935 $kg/m^3$, 940 $kg/m^3$, 945 $kg/m^3$, 950 $kg/m^3$, 955 $kg/m^3$, 960 $kg/m^3$, and 965 $kg/m^3$. Preferable density ranges are 935 to 960 $kg/m^3$ and 930 to 950 $kg/m^3$. A more preferable density range is 935 to 945 $kg/m^3$.

The first polyethylene-based resin, in terms of polystyrene, may have a number-average molecular weight Mn in the range of 25,000 to 50,000, a Z-average molecular weight Mz in the range of 700,000 to 1,300,000, and Mz/Mn m the range of 20 to 50 by GPC measurement. A first polyethylene-based resin that can be suitably used in the present invention has a tendency to have a larger Mz than normal medium-density to high-density polyethylene-based resins. For this reason, there is also a tendency for the Mz/Mn to be larger than normal medium-density to high-density polyethylene-based resins.

If the Mn is less than 25,000, impact resistance may become insufficient. If the Mn is larger than 50,000, expansion and molding may become difficult. If the Mz is less than 700,000, mechanical strength or thermal resistance may become insufficient. If the Mz is larger than 1,300,000, expansion and molding may become difficult. If the Mz/Mn is less than 20, the temperature dependency of mechanical properties may increase. If the Mz/Mn is larger than 50, expansion and molding may become difficult.

The Mn can be 25,000, 30,000, 35.000, 40.000, 45.000, and 50,000. The Mz can be 700,000, 800,000, 900,000, 1,000,000, 1,100,000, 1,200,000, and 1,300,000. The Mz/Mn can be 20, 25, 30, 35, 40, 45, and 50. A preferable Mn range is 25,000 to 48,000, and more preferably 28,000 to 48,000. Also, a preferable Mz range is 80,000 to 120,000, and more preferably 100,000 to 110,000. Furthermore, a preferable Mz/Mn range is 20 to 48, a more preferable Mz/Mn range is 25 to 48, further preferably 28 to 48, and particularly preferably 28 to 40.

The first polyethylene-based resin preferably has, in terms of polystyrene, a weight-average molecular weight Mw in the range of 150,000 to 250,000 and Mw/Mn in the range of 4.5 to 9.0 by GPC measurement. If the Mw is less than 150,000, impact resistance may become insufficient. If the Mw is larger than 250,000, expansion and molding may become difficult. If the Mw/Mn is less than 4.5, the temperature dependency of mechanical properties may increase. If the Mw/Mn is larger than 9.0, expansion and molding may become difficult.

The Mw can be 150.000, 170,000, 190,000, 210,000, 230,000, and 250,000. The Mw/Mn can be 4.5, 5.0. 6,0, 7,0, 8.0, and 9.0. A preferable Mw range is 160,000 to 240,000, and more preferably 200,000 to 240,000. Also, a preferable Mw/Mn range is 4.5 to 8.5, and more preferably 4.8 to 7.1.

Also, this resin may be provided with two or more peaks in an elution temperature-elution amount curve by continuous temperature rising elution fractionation (TREF). By having two or more peaks, an expanded molded article in which the temperature dependency of mechanical properties is suppressed and impact resistance is improved can be provided. Furthermore, the polyethylene-based resin preferably has two peaks. In particular, of the two peaks, preferably the high-temperature side peak exists between 85 and 100° C., and the low-temperature side peak exists between 65 and 80° C. Note that FIG. 1 shows a representative TREF elution temperature-elution amount curve of the polyethylene-based resins disclosed in the above-mentioned publications.

The first polyethylene-based resin is preferably a resin having a crystallization calorific value of 140 mJ/mg or more. Herein, if the crystallization calorific value is less than 140 mJ/mg, the temperature dependency of mechanical properties of the expanded molded article may increase. A preferable crystallization calorific value range is 150 to 200 mJ/mg, and more preferably 160 to 190 mJ/mg. The crystallization calorific value can be 150 mJ/mg, 160 mJ/mg, 170 mJ/mg, 1.80 mJ/mg, 190 mJ/mg, and 200 mJ/mg.

The first polyethylene-based resin is preferably a resin having a melt flow rate [MFR (g/10 min), measured at 190° C. with a load of 2.16 kg] in the range of 0.1 to 20. Herein, a polyethylene-based resin with an MFR of less than 0.1 g/10 min is not preferable since the expansion ratio deteriorates. Also, if more than 20 g/10 min, in addition to the melt tension decreasing and the expansion ratio deteriorating, the strength of the expanded molded article also deteriorates, and is thus not preferable. A more preferable MFR is 1 to 10 g/10 min and an even more preferable MFR is 2 to 5 g/10 min. The MFR can be 1 g/10min, 3 g/10 min, 5 g/10 min, 7 g/10 min, 9 g/10 min, and 10 g/10 min.

Any publicly-known resin having a density in the aforementioned range can be used for the first polyethylene-based resin. Preferably, any publicly-known resin also having the aforementioned specific molecular weights can be used. As the first polyethylene-based resin, ethylene homopolymers, and copolymers of ethylene and an α-olefin having 3 to 8 carbons can be mentioned. As the α-olefin having 3 to 8 carbons, propylene, 1-butene, 1 -hexene, 1 -octene, 4-methyl-1-pentene, 3-methyl-1-butene, vinyl cycloalkanes (for example, vinyl cyelopentane and vinyl cyclohexane), cyclic olefins (for example, norbornene and norbornadiene), dienes (for example, butadiene and 1,4-hexadiene), and the like can be mentioned. The ratio of the component derived from the olefin having 3 to 8 carbons in the polyethylene-based resin is not particularly limited, but is preferably 50% by mass or less, and more preferably 20% by mass or less. Note that styrene may be copolymerized with ethylene in a range that does not hinder the present invention.

As the publicly-known resins, for example, medium-density polyethylene and high-density polyethylene such as the NOVATEC HD series manufactured by Japan Polyethylene Corporation, the Evolue H series manufactured by Prime Polymer Co., Ltd., and the Nipolon Hard series and the TOSOH-HMS series manufactured by Tosoh Corporation can be mentioned.

Commercially-available resins can be used as the publicly-known first polyethylene-based resin also having the aforementioned specific molecular weight. As the commercially-available resins, for example, high-melt tension polyethylene obtainable from Tosoh Corporation (TOSOH-HMS series) can be mentioned. Also, as shown below, a polyethylene-based resin produced by the method disclosed in the aforementioned Patent Document 4 can also be suitably used.

As long as a polyethylene-based resin provided with the specific density or a polyethylene-based resin also having the specific molecular weight can be produced, any method can be used as the production method of the first polyethylene-based resin. For example, a multi-stage polymerization method in which the polymerization catalyst and/or the polymerization conditions are changed in multiple stages, a polymerization method by a catalyst in which a plurality of polymerization catalysts have been combined, a method in which a plurality of polyethylene-based resins which are prepared by the same or a different catalyst are blended, and the like can be mentioned, Separate arbitrary adjustment of the molecular weight, crystallization calorific value, and MFR of the polyethylene-based resin is possible by the production conditions per se in the below-mentioned examples or minor variation of conditional factors. Minor variation of conditional factors, for example, corresponds to changing an individual polymerization catalyst component to a combination of a plurality of polymerization catalyst components, changing the polymerization conditions, and the like. For example, separate adjustment is also possible by controlling so-called polymerization conditions shown by polymerization temperature, ethylene partial pressure, amount of molecular weight regulating agent such as co-existent hydrogen, and amount of added comonomer at the time of carrying out a polymerization reaction, and the like. For example, the molecular weight can be increased by reducing the amount of molecular weight regulating agent such as hydrogen or reduced by increasing the amount of molecular weight regulating agent such as hydrogen. Also, the crystallization calorific value can be increased by increasing the polymerization temperature or can be reduced by reducing the polymerization temperature. Furthermore, the MFR can be increased by increasing the amount of molecular weight regulating agent such as hydrogen or can be reduced by reducing the amount of molecular weight regulating agent such as hydrogen.

Of the first polyethylene-based resins, the first polyethylene-based resin in which the elution temperature-elution amount curve has two peaks can be obtained from, for example, Tosoh Corporation. Also, as shown below, the polyethylene-based resin produced by the method disclosed in the aforementioned Patent Document 4 can also be suitably used.

As the polymerization catalyst used in the production of the first polyethylene-based resin, for example, the polymerization catalysts disclosed in Japanese Unexamined Patent Application, First Publication No. 2004-346304, Japanese Unexamined Patent Application, First Publication No. 2005-248013, Japanese Unexamined Patent Application, First Publication No. 2006-321991, Japanese Unexamined Patent Application, First Publication No. 2007-1.69341, and Japanese Unexamined Patent Application, First Publication No. 2008-050278 and polymerization catalysts in which these are combined by a publicly-known method can be mentioned.

In the production of the first polyethylene-based resin, the polymerization temperature is preferably −100 to 120° C., and, when productivity is particularly considered, is preferably in the range of 20 to 120° C., and further preferably in the range of 50 to 120° C. The polymerization time is preferably in the range of 10 seconds to 20 hours and the polymerization pressure is preferably in the range of ambient pressure to 300 MPa.

When a first polyethylene-based resin formed from ethylene and an α-olefin having 3 to 8 carbons is used, ethylene/α-olefin having 3 to 8 carbons (molar ratio) is preferably 1 to 200, more preferably 3 to 100, and further preferably 5 to 50. Also, it is possible to carry out adjustment of the molecular weight by using hydrogen and the like at the time of polymerization.

Furthermore, the first polyethylene-based resin is preferably a resin obtained by polymerizing ethylene in the presence of a macromonomer. Specifically, such is a polyethylene-based resin obtained by copolymerizing: a macromonomer formed from a copolymer of an ethylene homopolymer having vinyl groups at the terminals thereof or ethylene and an olefin having 3 or more carbons; and an olefin having 2 or more carbons.

Herein, the macromonomer preferably has an Mn of 2,000 or more and Mw/Mn of 2to 5. As the olefin having 3 or more carbons, propylene, 1-butene, 1-hexene, 1-octene, 4-methyl-1-pentene, 3-methyl-1-butene, vinyl cycloalkanes (for example, vinyl cyclopentane and vinyl cyclohexane), and the like can be mentioned. These olefins may be used alone or by combining two or more thereof. In addition, the olefin having 2 or more carbons is selected from the aforementioned ethylene and α-olefin having 3 to 8 carbons.

The Mn of the macromonomer is preferably 5,000 or more, and is further preferably 10,000 or more. The upper limit is preferably 100,000. Also, the Mw/Mn is more preferably 2 to 4, and further preferably 2 to 3.5.

Also, when X is taken as the number of vinyl terminals per 1,000 methylene carbons, which is the main chain of the macromonomer, and Y is taken as the number of saturated terminals per 1,000 methylene carbons, which is the main chain of the macromonomer, Z represented by the formula $Z=X/[(X+Y)\times 2]$ is preferably 0.25 to 1. Z is more preferably 0.5 to 1. Note that it is well-known by a person skilled in the art that the number of vinyl terminals and saturated terminals can be measured by $^{1}$H-NMR, $^{13}$C-NMR, or FT-IR. For example, in the case of $^{13}$C-NMR, vinyl terminals have peaks at 114 ppm and 139 ppm, saturated terminals have peaks at 32.3 ppm, 22.9 ppm, and 14.1 ppm, and the numbers thereof can be measured from these peaks.

A first polyethylene-based resin suitably used in the present invention can be obtained by copolymerizing the aforementioned macromonomer and olefin. Herein, the ratio of the resin (resin A) derived from an olefin of 2 or more carbons other than that of the macromonomer, with respect to all of the resins, is preferably 1 to 99% by mass, more preferably 5 to 90% by mass, and further preferably 30 to 80% by mass. Measurement of the proportion of resin A can be carried out by comparing the GPC chart of the resin with the GPC chart of the macromonomer. Specifically, the peak derived from resin A is determined by comparison of both charts, and the proportion of the area of this peak with respect to the area of all peaks corresponds to the proportion of resin A.

Polymerization can be carried out by any method of batch-type, semi-continuous-type, and continuous-type and can be carried out by dividing into two or more steps by changing the polymerization conditions. Also, the first polyethylene-based resin, after the completion of polymerization, can be isolated by separating and collecting from the polymerization medium by a conventional method, and then drying.

Polymerization can be carried out in a slurry state, a solution state, or a gas phase state. In particular, if polymerization is carried out in a slurry state, a first polyethylene-based resin with ordered particle shape can be efficiently and stably produced. Also, the solvent used in polymerization can be any solvent as long as such is a normally-used organic solvent. Specifically, for example, benzene, toluene, xylene, propane, isobutane, pentane, hexane, heptane, cyclohexane, gasoline, and the like can be mentioned. Furthermore, an olefin itself such as propylene, 1-butene, 1-hexene, and 1-octene can be used.

(b) Second Polyethylene-Based Resin

The second polyethylene-based resin is a linear resin having a density lower than the first polyethylene-based resin (for example, linear low-density polyethylene-based resin: LLDPE).

Since the first polyethylene-based resins are mainly resins for which tensile fraction strain is small (for example, less than 500% when measured by JIS K6922-2: 2010), an expanded molded article having insufficient impact resistance may be obtained. Since the second polyethylene-based resin has a high tensile fraction strain, it is considered by the inventors that, by using in combination with the first polyethylene-based resin, impact resistance of the expanded molded article can be improved. Furthermore, the inventors have found that such effect is limited by only simply combining and that there is a specific combination ratio range.

The density of the second polyethylene-based resin is preferably in the range of 875 to 929 kg/$m^3$. The density can be 875 kg/$m^3$, 880 kg/$m^3$, 890 kg/$m^{3,}$ $^{900}$ kg/$m^3$, 91.0kg/$m^3$, 920 kg/$m^3$, and 929 kg/$m^3$. Also, the density of the second polyethylene-based resin is preferably 15 kg/$m^3$ or more lower than the density of the first polyethylene-based resin.

The second polyethylene-based resin, in terms of polystyrene, preferably has a number-average molecular weight Mn in the range of 65,000 to 90,000, a Z-average molecular weight Mz in the range of 250,000 to 400,000, and Mz/Mn in the range of 2 to 10 by GPC measurement. If the Mn is less than 65,000, the impact resistance may become insufficient. If the Mn is larger than 90,000, expansion and molding may become difficult. If the Mz is less than 250,000, mechanical strength may become insufficient. If the Mz is larger than 400,000, expansion and molding may become difficult. If the Mz/Mn is less than 2, thermal resistance may become insufficient. If the Mz/Mn is larger than 10, expansion and molding may become difficult.

The Mn can be 65,000, 70,000, 75,000, 80,000, 85,000, and 90,000. The Mz can be 250,000, 270,000, 300,000, 320,000, 350,000, 370,000, and 400,000. The Mz/Mn can be 2, 4, 6, 8, and 10. A more preferable Mn range is 70,000 to 85,000. Also, a more preferable Mz range is 300,000 to 350,000. Furthermore, a more preferable Mz/Mn range is 3 to 5.

The second polyethylene-based resin, in terms of polystyrene, preferably has a weight-average molecular weight Mw in the range of 150,000 to 250,000 and Mw/Mn in the range of 1.5 to 8 by GPC measurement. If the Mw is less than 150,000, impact resistance may become insufficient. If the Mw is larger than 250,000, expansion and molding may become difficult. If the Mw/Mn is less than 1.5, temperature dependency of mechanical properties may increase. If the Mw/Mn is larger than 8, expansion and molding may become difficult.

The Mw can be 150,000, 170,000, 190,000, 210,000, 230,000, and 250,000. The Mw/Mn can be 1.5, 2, 3, 4, 5, 6, 7 and 8. A preferable Mw range is 180,000 to 220,000, and more preferably 180,000 to 200,000. Also, a preferable Mw/Mn range is 2 to 5, and more preferably 2 to 3.

The second polyethylene-based resin is preferably a resin having a crystallization calorific value of 120 mJ/mg or less. Herein, if the crystallization calorific value is larger than 120 mJ/mg, the temperature dependency of the mechanical properties of the expanded molded article m ay increase. A preferable crystallization calorific value range is 70 to 120 mJ/mg, and more preferably 85 to 115 mJ/mg. The crystallization calorific value can be 70 mJ/mg, 80 mJ/mg, 90 mJ/mg, 100 mJ/mg, 110 mJ/mg, and 120 mJ/mg.

The crystallization calorific value of the first polyethylene-based resin is preferably 30 mJ/mg larger than the crystallization calorific value of the second polyethylene-based resin. The inventors consider that the temperature dependency of the mechanical properties of the expanded molded article can be reduced by adding the first polyethylene-based resin having a large crystallization calorific value to the second polyethylene-based resin having a small crystallization calorific value.

The second polyethylene-based resin is preferably a resin having a melt flow rate [MFR (g/10 min), measured at 190° C. with a load of 2.16 kg] in the range of 0.1 to 20. Herein , a polyethylene-based resin with an MFR of less than 0.1 g/10 min is not preferable since the expansion ratio deteriorates. Also, if more than 20 g/10 min, in addition to the melt tension decreasing and the expansion ratio deteriorating, the strength of the expanded molded article also deteriorates, and is thus not preferable. A more preferable MFR is 1 to 10 g/10 min and an even more preferable MFR is 2 to 5 g/10 min. The MFR can be 1 g/10 min, 3 g/10 min, 5 g/10 min, 7 g/10 min, 9 g/10 min, and 10 g/10 min.

Considering compatibility with the first polyethylene-based resin, the inventors consider that it is preferable for the MFR of the second polyethylene-based resin to be close to the MFR of the first polyethylene-based resin.

The second polvethylene-based resin is usually formed from an ethylene homopolymer or a copolymer of ethylene and an α-olefin having 3 to 8 carbons. As the α-olefin having 3 to 8 carbons, propylene, 1-butene, 1-hexene, 1-octene, 4-methyl-1-pentene, 3-methyl-1-butene, vinyl cycloalkanes (for example, vinyl cyclopentane and vinyl cyclohexane), cyclic olefins (for example, norbornene and norbornadiene), dienes (for example, butadiene and 1,4-hexadiene), and the like can be mentioned. The ratio of the component derived from the olefin having 3 to 8 carbons in the polyethylene-based resin is not particularly limited, but is preferably 50% by mass or less, and more preferably 20% by mass or less. Note that styrene may be copolymerized with ethylene in a range that does not hinder the present invention.

A commercially-available resin can be used as the second polyethylene-based resin.

The content ratios of the first polyethylene-based resin and the second polyethylene-based resin, with respect to the total of both resins, are 90 to 30% by mass for the former and 10 to 70% by mass for the latter. If the proportion of the former is larger than 90% by mass, impact resistance may become insufficient. On the other hand, if smaller than 30% by mass, the temperature dependency of mechanical properties may increase. The content proportion of the former can be 90% by mass, 80% by mass, 70% by mass, 60% by mass, 50% by mass, 40% by mass, and 30% by mass. Preferable content ratios of the former and the latter are 80 to 40% by mass and 20 to 60% by mass respectively. More preferable content ratios of the former and the latter are 80 to 50% by mass and 20 to 50% by mass respectively, and further preferable content ratios of the former and the latter are 80 to 60% by mass and 20 to 40% by mass respectively.

(c) Other Components

Other resins may be included in the polyethylene-based resin to the extent that the object of the present invention is not deviated from. As the other resins, α-olefin homopolymers and copolymers having 2 to 20 carbons can be mentioned. Specifically, polypropylene, poly 1-butene, poly(4-methyl-1-pentene), poly-1-pentene, ethylene/propylene copolymers, ethylene/1-butene copolymers, propylene/1-butene copolymers, ethylene/propylene/1-butene copolymers, 4-methyl-1-pentene/ethylene copolymers, ethylene/propylene/polyene copolymers, various propylene-based block copolymers and propylene-based random copolymers, and the like can be mentioned. The added ratio of these other resins is preferably 50% by mass or less, and more preferably 30% by mass or less, with respect to the total polyethylene-based resin amount.

As required, additives such as coloring agents, stabilizers, filler materials (reinforcement materials), higher fatty acid metal salts, flame retardants, anti-static agents, lubricants, natural or synthetic oils, waxes, ultraviolet absorbers, weathering stabilizers, anti-clouding agents, anti-blocking agents, slipping agents, coating agents, and neutron shielding agents may be included in the polyethylene-based resin. Among these, as coloring agents, both inorganic and organic coloring agents (pigments or dyes) can be used. In particular, inorganic coloring agents such as iron oxide and carbon black are preferable.

As the carbon black, furnace black, channel black, thermal black, acetylene black, graphite, carbon fibers, and the like can be mentioned.

The carbon black may exist in the composite resin particles by being added as a composition in which carbon black is dispersed in the base resin, a so-called master batch, at the time of composite resin particle production. The master batch includes carbon black in a ratio of preferably 30 to 50 parts by mass, and more preferably 35 to 45 parts by mass, with respect to 100 parts by mass of the master batch. A polyethylene-based resin is preferable as a base resin included in the master batch.

The carbon black is preferably included in the range of 1 to 25% by mass in the polyethylene-based resin. If less than 1% by mass, the polyethylene-based resin may not be sufficiently colored. If more than 25% by mass, mixing in the polyethylene-based resin tends to become difficult. The content can be 1% by mass, 5% by mass, 10% by mass, 15% by mass, 20% by mass, and 25% by mass. A more preferable content is in the range of 2 to 15% by mass.

The stabilizer achieves the role of preventing oxidative degradation, heat degradation, and the like, and any publicly-known stabilizer can be used. For example, phenol-based stabilizers, organic phosphite-based stabilizers, thioether-based stabilizers, hindered amine-based stabilizers, and the like can be mentioned.

As the filler material, talc, glass, and the like can be mentioned. The shape thereof is not particularly limited, and may be spherical, sheet-like, fibrous, and the like.

As the higher fatty acid metal salt, salts of: a high fatty acid such as stearic acid, oleic acid, or lauric acid: and an alkali earth metal (magnesium, calcium, barium, or the like) or an alkali metal (sodium, potassium, lithium, or the like) can be mentioned.

(2) Polystyrene-Based Resin

As the polystyrene-based resin, for example, resins derived from styrene-based monomers such as styrene monomer, α-methylstyrene, p-methylstyrene, and t-butylstyrene can be mentioned. Furthermore, the polystyrene-based resin may be a component formed from a copolymer of a styrene-based monomer and another monomer copolymerizable with the styrene-based monomer. As the other monomer, polyfunctional monomers such a divinylbenzene, alkyl ester (meth)acrylates not including a benzene ring in the structure like butyl (meth)acrylate, and the like are exemplified. These other monomers may be used in a range that does not exceed 5% by mass with respect to the polystyrene-based resin.

The amounts of the polyethylene-based resin and the polystyrene-based resin, with the total of both resins being 100% by mass, are 50 to 20% by mass and 50 to 80% by mass respectively. Also, if the amount of the polystyrene -based resin exceeds 80% by mass, chemical resistance and impact resistance of the expanded molded article may deteriorate. If less than 50% by mass, rigidity of the expanded molded article may deteriorate. The content ratio of the former can be 50% by mass, 45% by mass, 40% by mass, 35% by mass, 30% by mass, 25% by mass, and 20% by mass. Preferable amounts are 40 to 20% by mass and 60 to 80% by mass respectively, and more preferable amounts are 40 to 30% by mass and 60 to 70% by mass respectively.

(3) Shape

The shape of the composite resin particles is cylindrical or substantially spherical to spherical, and the average particle diameter is preferably 1.0 to 2.0 mm. The shape, in order to improve packing ability, is preferably substantially spherical to spherical.

If the average particle diameter is less than 1.0 mm, retention of the physical blowing agent may become low when used in expandable particles and there is a tendency for lowering of the density to become difficult. If more than 2.0 mm, there is a tendency for the packability into a molding cavity to deteriorate when used in pre-expanded particles and there is a tendency for thinning of the expanded molded art to become difficult.

(4) Other

The gel fraction of the composite resin particles is preferably suppressed to 5% by weight or less. By being suppressed, recyclability of the expanded molded article derived from these particles can be improved. The gel fraction can be 5% by weight, 4% by weight, 3% by weight, 2% by weight, 1% by weight, and 0% by weight.

(Expandable Particles)

The expandable particles are particles in which a physical blowing agent is impregnated into the aforementioned composite resin particles. As the physical blowing agent, for example, propane, n-butane, isobutane, n-pentane, isopentane, cyclopentane, hexane, dimethylether, and the like can be mentioned. These blowing agents can be used alone or by mixing two or more thereof. The content of the physical blowing agent is preferably 5 to 25 parts by mass with respect to 100 parts by mass of the composite resin particles.

The average particle diameter of the expandable particles can be made about the same as the aforementioned composite resin particles. Also, the shape, in order to improve packability, is preferably substantially spherical to spherical.

(Pre-Expanded Particles)

The pre-expanded particles are particles obtained by pre-expanding the aforementioned expandable particles.

The pre-expanded particles preferably have a bulk density of 20 to 200 $kg/m^3$. If the bulk density is smaller than 20 $kg/m^3$, the closed cell ratio when expanded may decrease, causing deterioration in the strength of the expanded molded article obtained from the pre-expanded particles. On the other hand, if larger than 200 $kg/m^3$, the obtained expanded molded article may not be able to be made lightweight. A more preferable bulk density is 25 to 100 $kg/m^3$. The measurement method of the bulk density is mentioned in the Examples section.

The Z-average molecular weight Mz by GPC measurement of the polystyrene-based resin forming the pre-expanded particles is preferably 600,000 to 1,000,000. If the Mz is less than 600,000, strength of the expanded molded article may deteriorate, and is thus not preferable. On the other hand, if higher than 1,000,000, secondary expandability of the pre-expanded particles may deteriorate and the fusability of pre-expanded particles may deteriorate, causing the strength of the expanded molded article to deteriorate, and is thus not preferable.

The Mz can be 600,000, 700,000, 800,000, 900,000, and 1,000,000. A more preferable Z-average molecular weight Mz is 700,000 to 900,000.

The weight-average molecular weight Mw by GPC measurement of the polystyrene-based resin is preferably 250,000 to 450,000. If the Mw is less than 250,000, strength of the expanded molded article may deteriorate, and is thus not preferable. On the other hand, if higher than 450,000, secondary expandability of the pre-expanded particles may deteriorate and the fusability of pre-expanded particles may deteriorate, causing the strength of the expanded molded article to deteriorate, and is thus not preferable.

The Mw can be 250,000, 280,000, 300,000, 330,000, 350,000, 370,000, 400,000, 430,000, and 450,000. A more preferable weight-average molecular weight Mw is 300,000to 400,000.

(Expanded Molded Article)

The expanded molded article is a molded article obtained by in-die expansion molding the aforementioned pre-expanded particles. The expanded molded article, in addition to having excellent chemical resistance, impact resistance, and rigidity, has further improved temperature dependency.

As an evaluation test for the temperature dependency of mechanical properties, for example, there is a dynatap impact compression test according to ASTM D3763-92.

Firstly, in the dynatap impact compression test, the ratio $Q_{-35}/Q_{23}$ of the obtained generated loads at 50% compression $Q_{-35}$ and $Q_{23}$ when evaluated at −35° C. and 23° C. respectively can be 1.22 or less. Furthermore, the ratio $Q_{65}/Q_{23}$ of the obtained generated loads at 50% compression $Q_{23}$ and $Q_{65}$ when evaluated at 23° C. and 65° C. respectively can be 0.77 or more.

Next, in the dynatap impact compression test, the ratio $E_{-35}/E_{23}$ of the absorption energies at 50% compression $E_{-35}$ and $E_{23}$ when evaluated at -35° C. and 23° C. respectively can be 1.22 or less. Furthermore, the ratio $E_{65}/E_{23}$ of the absorption energies at 50% compression $E_{23}$ and $E_{35}$ when evaluated at 23° C. and 65° C. respectively can be 0.77 or more.

From the aforementioned test, in accordance with the present invention, an expanded molded article having low temperature dependency of mechanical properties in the range of, for example, −35° C. to 65° C., can be provided.

Furthermore, if a first polyethylene-based resin having a number-average molecular weight Mn in the range of 25,000 to 50,000, a Z-average molecular weight Mz in the range of 700,000 to 1,300,000, and Mz/Mn in the range of 20 to 50 is used, and the content ratios of the first polyethylene-based resin and the second polyethylene-based resin are 90 to 30% by mass for the former and 10 to 70% by mass for the latter (more preferably, the former is 80 to 50% by mass and the latter is 20 to 50% by mass), an expanded molded article having lower temperature dependency in the range of −35° C. to 65° C. can be provided.

Specifically, firstly, in the dynatap impact compression test, the ratio $Q_{-35}/Q_{23}$ of the obtained generated loads at 50% compression $Q_{-35}$ and $Q_{23}$ when evaluated at −35° C. and 23° C. respectively can be 1.20 or less. Furthermore, the ratio $Q_{65}/Q_{23}$ of the obtained generated loads at 50% compression $Q_{23}$ and $Q_{65}$, when evaluated at 23° C. and 65° C. respectively can be 0.80 or more.

Next, in the dynatap impact compression test, the ratio $E_{-35}/E_{23}$ of the absorption energies at 50% compression $E_{-35}$ and $E_{23}$ when evaluated at −35° C. and 23° C. respectively can be 1.20 or less. Furthermore, the ratio $E_{65}/E_{23}$ of the absorption energies at 50% compression $E_{23}$ and $E_{65}$ when evaluated at 23° C. and 65° C. respectively can be 0.80 or more.

Also, in accordance with the present invention, an expanded molded article having a falling ball impact value by JIS K7211: 1976 of 25 cm or more can be obtained.

The expanded molded article preferably has a density of 20 to 200 kg/$m^3$. If the density is less than 20 kg/$m^3$, strength may deteriorate since the closed cell ratio increases. On the other hand, if larger than 200 kg/$m^3$, the mass may increase. A more preferable density is 25 to 100 kg/$m^3$. The measurement method of density is mentioned in the Examples section.

Although the expanded molded article of the present invention can be used for many uses, it can be used in various uses such as bumper cores, vehicle cushioning materials such as door interior cushioning materials, and cushioning materials and transportation containers for various industrial materials including electronic components and glass, and for food. In particular, it can be suitably used in vehicle cushioning materials.

(Production Methods of Composite Resin Particles, Expandable Particles, Pre-Expanded Particles, and Expanded Molded Article)

Firstly, although the composite resin particles can be produced by melt kneading the polyethylene-based resin and the polystyrene-based resin, and cutting into a particle shape, for example, they can be preferably produced as follows.

That is, seed particles of the aforementioned polyethylene-based resin and the styrene-based monomer are dispersed in an aqueous suspension together with a polymerization initiator as required. Note that the styrene-based monomer and the polymerization initiator may be used by mixing in advance.

The seed particles can be obtained by a publicly-known method. For example, a method of producing particles by melt kneading the polyethylene-based resin together with an inorganic nucleating agent and additives as required in an extruder and extruding to obtain strands, and cutting in air, cutting in water, or cutting while heating the obtained strands.

The polyethylene-based resin seed particles are cylindrical or substantially spherical to spherical, and the average particle diameter is preferably 0.2 to 1.5 mm. Also, the shape, in order to improve packability, is preferably substantially spherical to spherical. If the average particle diameter is less than 0.2 mm, retention of the blowing agent becomes low and there is a tendency for lowering of the density to become difficult when used in expandable particles, and is thus not preferable. If more than 1.5 mm, there is a tendency for packability into a molding cavity to deteriorate as well as for thinning of the expanded molded article to become difficult when used in pre-expanded particles.

As the inorganic nucleating agent, for example, talc, silicon dioxide, mica, clay, zeolite, calcium carbonate, and the like can be mentioned. The used amount of the inorganic nucleating agent is preferably 2 parts by mass or less, and more preferably 0.2 to 1.5 parts by mass, with respect to 100 parts by mass of the polyethylene-based resin.

As the aqueous medium forming the aqueous suspension, water; and a combined medium of water and a water-soluble solvent (for example, lower alcohol) can be mentioned.

As the polymerization initiator, polymerization initiators normally used as initiators for styrene-based monomer suspension polymerization can be used. For example, these are organic peroxides such as benzoyl peroxide, di-t-butyl peroxide, t-butylperoxy benzoate, dicumyl peroxide, 2,5-dimethyl-2,5-di-t-butyl peroxyhexane, t-butylperoxy-3,5,5- trimethyl hexanoate, and t-butyl-peroxy-2-ethylhexyl carbonate. These polymerization initiators may be used alone or by combining two or more thereof.

The used amount of polymerization initiator is preferably 0.1 to 0.9 parts by mass with respect to 100 parts by mass of the styrene-based monomer. If less than 0.1 parts by mass, it may take too much time to polymerize the styrene-based monomer. If more than 0.9 parts by mass of polymerization initiator is used, the molecular weight of the polystyrene-based resin may decrease. A more preferable amount is 0.2 to 0.5 parts by mass.

A dispersant may be added to the aqueous suspension as required. As the dispersant, there are no particular limitations, and any publicly-known dispersant can be used. Specifically, poorly soluble inorganic substances such as calcium phosphate, magnesium pyrophosphate, sodium pyrophosphate, and magnesium oxide can be mentioned. Furthermore, a surfactant like sodium dodecylbenzenesulfonate may be used.

Next, the obtained dispersion is heated to a temperature at which the styrene-based monomer does not substantially polymerize so as to impregnate the styrene-based monomer into the seed particles. 30 minutes to 2 hours is appropriate as the time for impregnating the styrene-based monomer into the seed particles. This is since a polymer powder of the polystyrene-based resin is generated if polymerization progresses before sufficient impregnation. Regarding the aforementioned temperature at which the styrene-based monomer does not substantially polymerize, although a high temperature is advantageous for increasing the impregnation rate, such is preferably decided considering the decomposition temperature of the polymerization initiator.

Subsequently, polymerization of the styrene-based monomer is carried out. The polymerization is not particularly limited, but is preferably carried out at 105 to 140° C. for 1.5 to 5 hours. The polymerization is normally carried out in a pressurizable closed vessel.

Note that impregnation and polymerization of the styrene-based monomer may be carried out by dividing into a plurality of times. By dividing into a plurality of times, generation of the polymer powder of the polystyrene-based resin can be minimized.

Composite resin particles can be obtained by the aforementioned process. It is considered by the inventors that the physical properties of the expanded molded article are favorably influenced since, regarding the obtained composite resin particles, the interior is polystyrene-based resin rich and the outer shell part is polyethylene-based resin rich.

Next, the expandable particles can be obtained by impregnating a physical blowing agent into the composite resin particles during the aforementioned polymerization or after the polymerization has been completed. This impregnation can be carried out by a publicly-known method. For example, impregnation during polymerization can be carried out by carrying out the polymerization reaction in a closed vessel and feeding the physical blowing agent under pressure into the vessel. Impregnation after the completion of polymerization is carried out by feeding the physical blowing agent under pressure into the closed vessel.

Furthermore, the pre-expanded particles can be obtained by pre-expanding the aforementioned expandable particles by a publicly-known method to a given bulk density.

Moreover, the expanded molded article can be obtained by packing the pre-expanded particles into the molding cavity of an expansion molder and then thermally fusing the expanded particles while expanding the pre-expanded particles by reheating. Steam can be suitably used as the medium for heating.

EXAMPLES

Although the present invention is specifically explained below by way of examples, the present invention is not limited by these examples. Note that, unless otherwise stated, commercial products were used as the reagents and the like. Preparation of the clay mineral treated with an organic compound, preparation of the catalyst for ethylene-based polymer production, production of the ethylene-based polymer, and solvent purification were all carried out in an inert gas atmosphere. Also, all of the solvents used were solvents purified, dried, and deoxygenated in advance by publicly methods. As the hexane solution (0.714 M) of triisobutyl aluminum, that manufactured by Tosoh Finechem Corporation was used.

The measurement method of each physical property in the below-mentioned examples is stated below.

<Measurement of Density of Polyethylene-Based Resin>

The density was measured by the method disclosed in J1S K6922-1: 1997 "Plastics—Polyethylene (PE) Molding and Extrusion Materials—Part 1: Designation System and Basis for Specifications".

<MFR of Polyethylene-Based Resin>

The MFR was measured by the method disclosed in JIS K6922-1: 1997 "Plastics—Polyethylene (PE) Molding and Extrusion Materials—Part 1: Designation System and Basis for Specifications" at 190° C. and a load of 2.18 kg.

<Measurement of Elution Temperature-Elution Amount Curve by TREF>

The mixture obtained by adding heat-resistant stabilizers (manufactured by Ciba Specialty Chemicals Corporation, Irganox 1010™; 1,500 ppm and Irgafos 168™; 1,500 ppm) to a polyethylene-based resin was kneaded using an internal mixer (manufactured by Toyo Seiki Seisaku-sho Ltd, product name: Laboplast Mill) under a nitrogen gas flow at 190° C. at a rotational frequency of 30 rpm from 30 minutes. The kneaded product was dissolved with the addition of heat at 135° C. in ODCB so that the concentration thereof became 0.05% by mass. 5 ml of the heated solution, after being injected into a column filled with glass beads, was cooled at a cooling rate of 0.1° C./min until 25° C. and the sample deposited on the surface of the glass beads. Next, flowing ODCB in this column at a constant flow amount, the column temperature was raised at a constant rate of 50° C./hr and a sample capable of dissolution in the solution at each temperature was preparatorily eluted.

When doing so, the sample concentration in the solvent can be obtained by continuously detecting with an infrared detector the absorption at a wavenumber of 2,925cm$^{-1}$ of the asymmetric stretching vibration of the methylene. From the continuously detected concentration, the elution temperature-elution amount curve can be obtained. Since TREF analysis can continuously analyze the elution rate change with respect to temperature change with a very small amount of sample, it is possible to detect comparatively fine peaks which cannot be detected by a fractionation method.

<Measurement of Z-Average Molecular Weight (Mz), Weight-Average Molecular Weight (Mw), Number-Average Molecular Weight (Mn), Mz/Mn, and Mw/Mn of Polyethylene-Based Resin>

The aforementioned values mean the polystyrene (PS)-converted values measured by an internal standard method using gel permeation chromatography (GPC).

Specifically, a 10 mg sample was enclosed in a filter container (100 μm pore size) attached to a dissolution and filter device (DF-8020 manufactured by Tosoh Corporation). The filter container and 6 mL of o-dichlorobenzene containing 0.05% by weight of BUT (butylhydroxytoluene) were added to a test tube and the test tube was then stoppered. The solution obtained by dissolving at 160° C. for 5 hours using the DF-8020 manufactured by Tosoh Corporation was taken as the measurement sample. Measurement was carried out using chromatography under the following conditions, Mz, Mw, and Mn were determined from the working curve of standard polystyrene created in advance, and Mz/Mn and Mw/Mn were calculated from each of the obtained average molecular weights.

Used device: HLC-8121GPC/HT manufactured by Tosoh Corporation

Guard column: TSKguardcolumn HHR(S)HT 1 column (7.5 mm I. D.×7.5 cm)×1

Column: TSKgel GMHHR-H(S).H.T (7.8 mm I. D.×30 cm)×2

Mobile phase: o-dichlorobenzene

Sample flow rate: 1.0 mL/min

Reference flow rate: 0.5 mL/min

Detector: RI detector

Sample concentration: 0.17 wt %

Injection amount: 300 μL

Measurement time: 40 min

Sampling pitch: 300 msec (Set Temperature of Each Device Part)

Solvent stocker: 50° C., system oven: 40° C., pre-oven: 145° C., column oven (column temperature): 145° C., sample table: 145° C., injection valve: 145° C., transline: 145° C., waste liquid line: 145° C., detector: 145° C.

As the standard polystyrene samples for working curve, product name: "Shodex" manufactured by Show a Denko K. K with weight-average molecular weights of 5,620,000, 3,120,000, 1,250,000, 442,000, 131,000, 54,000. 20,000, 7,590, 3,450, and 1.320 was used.

After separating the aforementioned standard polystyrene samples for working curve into group A (5,620,000, 1,250, 000, 131,000, 20,000, and 3,450) and group B (3,120,000, 442,000, 54,000, 7,590, and 1,320), 3 to 10 mg of each A was accurately weighed and then dissolved in 50 mL of o-dichlorobenzene and 3 to 10 mg of each B was accurately weight and then dissolved in 50 mL of o-dichlorobenzene. The standard polystyrene working curve was obtained by creating a calibration curve (cubic) from the retention time obtained after injecting 300 μL of the prepared A and B solutions and measuring, Mz, Mw, and Mn were determined using such working curve, and Mz/Mn and Mw/Mn were calculated from each of the obtained average molecular weights.

<Measurement of Melting Point of Polyethylene-Based Resin>

This was measured by the method disclosed in JLS K7121: 1987 "Testing Methods for Transition Temperatures of Plastics". However, regarding the sampling method and temperature conditions was carried out as follows.

Using the differential scanning calorimeter device DSC6220 (manufactured by SII NanoTechnology Inc.), about 6 mg of a sample was packed into the bottom of an aluminum measurement container so there was no gap, the temperature was lowered from 30° C. to −40° C. under a nitrogen gas flow rate of 20 mL/min, and then maintained thereat for 10minutes. The temperature was then raised from −40° C. to 220° C. (1st heating) and after being maintained thereat for 10 minutes, the temperature was lowered from 220° C. to −40° C. (cooling). After being maintained thereat for 10 minutes, the temperature was raised from −40° C. to 220° C. (2nd heating) and the DSC curve at this point was obtained. In addition, all of the temperature lowering and temperature raising were carried out at a speed of 10° C./min and alumina was used as the reference substance. In the present invention, the melting point is the read value of temperature from the top of the melt peak seen in the 2nd heating step.

<Crystallization Calorific Value of Polyethylene-Based Resin>

This was measured by the method disclosed in JLS K7122: 1987 "Testing Methods for Heat of Transitions of Plastics". However, regarding the sampling method and temperature conditions was carried out as follows.

Using the differential scanning calorimeter device DSC6220 (manufactured by SII NanoTechnology Inc.), about 6 mg of a sample was packed into the bottom of an aluminum measurement container so there was no gap, the temperature was lowered from 30° C. to −40° C. under a nitrogen gas flow rate of 20 mL/min, and then maintained thereat for 10minutes. The temperature was then raised from −40° C. to 220° C. (1st heating) and after being maintained thereat for 10 minutes, the temperature was lowered from 22Q° C to −40° C. (cooling). After being maintained thereat for 10 minutes, the temperature was raised from −40° C. to 220° C. (2nd heating) and the DSC curve at this point was obtained. In addition, all of the temperature lowering and temperature raising were carried out at a speed of 10° C./min and alumina was used as the reference substance. In the present invention, the crystallization calorific value is taken to be the value determined from the area of the exothermic peak of the DSC curve seen in the cooling step. This calorific value is calculated from the area of the part surrounded by the straight line joining the point at which the exothermic peak separates from the baseline on the high-temperature side and the point at which the exothermic peak returns to the baseline on the low-temperature side of the DSC curve.

<Gel Fraction of Composite Resin Particles>

Measurement of the gel fraction (wt %) was carried out as follows.

1.0 g of composite resin particles was accurately weighed into a 200 mL recovery flask, 100 ml of toluene and boiling chips were added thereto, a condenser tube was connected to the recovery flask, and the mixture was refluxed for 24 hours by immersing the recovery tube in an oil bath maintained at 130° C. The solution in the recovery flask was then filtered with an 80 mesh (wire diameter ø: 0.12 mm) wire gauze while still hot. After drying the metal gauze with resin insoluble matter in a vacuum oven at 130° C. for 1 hour, toluene was removed by drying at a gauge pressure of −0.06 MPa for 2 hours. After then cooling to room temperature, the weight of insoluble resin on the metal gauze was accurately weighed. The gel fraction was determined by the following calculation formula.

Gel fraction (wt %)=weight of insoluble resin on metal gauze (g)/sampie weight (g)×100

<Average Particle Diameter of Composite Resin Particles>

The average particle diameter is the value represented by D50.

Specifically, using a Ro-Tap sieve shaker (manufactured by Tida Seisakusho), about 25 g of a sample was classified over 10 minutes with a JIS-standard sieve (JIS Z8801-1: 2006) having sieve openings of 4.00 mm, 3.35 mm, 2.80 mm, 2.36 mm, 2.00 mm, 1.70 mm, 1.40 mm, 1.18 mm, 1.00 mm, 0.85 mm, 0.71 mm, 0.60 mm, 0.50 mm, 0.425 mm, 0.355 mm, 0.300 mm, 0.250 mm, 0.212 mm, and 0.180 mm, and the weight of the sample on the mesh was measured. From the obtained result, a cumulative weight distribution curve was prepared and the particle diameter (median diameter) when the cumulative weight becomes 50% is the average particle diameter.

<Bulk Density and Bulk Expansion Ratio of Pre-Expanded Particles>

The bulk density of the pre-expanded particles was measured as follows.

Firstly, pre-expanded particles were packed to the 500 $cm^3$ memory unit of a measuring cylinder. However, packing was completed if even one of the pre-expanded particles reached the 500 $cm^3$ memory unit when the measuring cylinder is viewed from a horizontal direction. Next, the mass of pre-expanded particles in the measuring cylinder was accurately weighed to two decimal places, and this mass was taken as W (g). The bulk density was determined by the following calculation formula.

$$\text{Bulk density}(kg/m^3)=W\div 500\times 1000$$

1,000-times the inverse of the bulk density is the bulk expansion ratio.

<Measurement of Z-Average Molecular Weight (Mz) and Weight-Average Molecular Weight (Mw) of Polystyrene-Based Resin>

The Z-average molecular weight (Mz) and weight-average molecular weight (Mw) of polystyrene-based resin mean the polystyrene-converted average molecular weights measured by gel permeation chromatography (GPC). Hereinbelow, although the measurement methods of various average molecular weights of the polystyrene-based resin in the expanded molded article are explained, since the expanded molded article is an aggregate of composite resin particles and the various average molecular weights do not change by the process from composite expanded particles to production of the expanded molded article, the various molecular weights of the composite resin particles, expandable particles, and pre-expanded particles are the same as those of the expanded molded article.

Firstly, the expanded molded article was sliced with a slicer (FK-4N manufactured by Fujishima Koki Co., Ltd.) so as to become thickness 0.3 mm, length 100 mm, and width 80 mm, and this was treated as the sample for molecular weight measurement. Specifically, 3 mg of the sample was left to stand for 24 hours in 10 mL of tetrahydrofuran, so as to completely dissolve therein, after then filtering the obtained solution with a non-aqueous-based 0.45 μm chromatodisc (manufactured by GL), measurement was carried out using a chromatograph under the below-mentioned conditions, and the average molecular weight of the sample was determined from the working curve of standard polystyrene created in advance. Also, if the expanded molded article had not completely dissolved at such point, it was further left to stand for 24 hours (up to a total of 72 hours) and confirmed whether the expanded molded article had completely dissolved. If complete dissolution was not possible after 72 hours, it was determined that a cross-linked component is included in the sample and the molecular weight of the dissolved components was measured, (Measurement Conditions)

Used device: HL08320GPC EcoSEC System manufactured by Tosoh Corporation (built-in RI detector)

Guard column: TKSguardcolumn SuperHZ-H (4.6 mm I. D.×2 cm)×1

Column: TSKgel SuperHZM-H (4.6 mm I. D.×15 cm)×2

Column temperature: 40° C.

System temperature: 40° C.

Mobile phase: THE

Mobile phase flow rate: Sample side pump=0.175 mL/min Reference side pump=0.175 mL/min Detector: RX detector Sample concentration: 0.3 g/L Injection amount: 50 μL Measurement time: 0 to 25 min Run time: 25 min Sampling pitch: 200 msec (Creation of Working Curve)

As the standard polystyrene samples for working curve, product name "TSK standard POLYSTYRENE" manufactured by Tosoh Corporation with weight-average molecular weights of 5,480,000, 3,840,000, 355,000, 102,000, 37,900, 9,100, 2,630, and 500and product name: "Shodex STANDARD" manufactured by Showa Denko K. K with a weight-average molecular weight of 1,030,000 were used.

After separating the aforementioned standard polystyrene samples for working curve into group A (1,030,000), group B (3,840,000, 102,000, 9,100, and 500), and group C (5,480,000, 355,000, 37,900, and 2,630), 5 mg of group A was accurately weighed and then dissolved in 20 ml of THF, 5 to 10 mg of each of group B was accurately weight and then dissolved in 50 ml of THF, and 1 to 5 mg of each of group C was accurately weight and then dissolved in 40 mL of THF. The standard polystyrene working curve was obtained by creating a calibration curve (cubic) with a HLC-8320 GPC private data analysis program GPC workstation (EcoSEC-WS) from the retention time obtained after injecting 50 μL of each of the prepared A, B, and C solutions and measuring, and the average molecular weights were calculated using such working curve.

<Density and Expansion Ratio of Expanded Molded Article>

The density of the expanded molded article was measured by the method disclosed in JIS A9511: 1995 "Preformed Cellular Plastics Thermal Insulation Materials".

The 1,000-times inverse of density is the expansion ratio.

<Generated Load at 50% Compression and Absorption Energy at 50% Compression of Expanded Molded Article at Each Test Temperature>

The aforementioned values were measured by a dynatap impact compression test according to ASTM D3763-92 (Standard Test Method for High Speed Puncture Properties of Plastics Using Load and Displacement Sensors). The following conditions were set for the measurement.

Test device: The dynatap impact test device GRC 8250 manufactured by General Research Corporation was used, and the tap tip and clamp were changed as follows.

Figure 4:
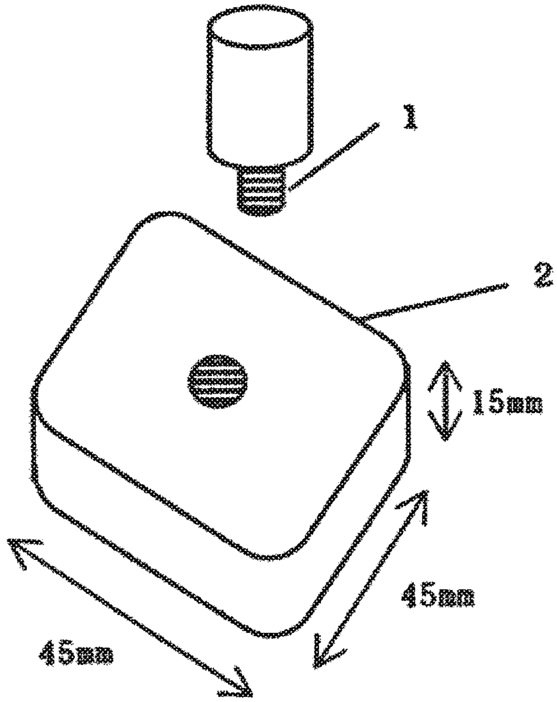
FIG. 4 is a schematic diagram of the instrument for measurement of the generated load at 50% compression and the absorption energy at 50% compression.

A tip 1 of a tap (3,500 lbs (15,568 N)) was made a compression test flat plate (upper cavity) 2 (stainless, length 45 mm×width 45 mm×height 15 mm, weight 225 g) from a ø ½ inch semi-circular insert. Refer to FIG. 4.

Figure 5:
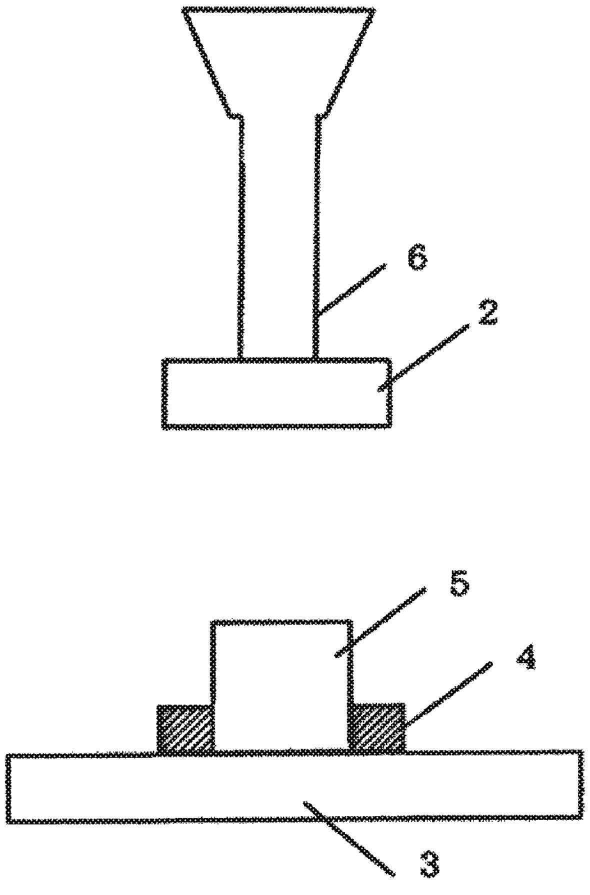
FIG. 5 is a schematic diagram of the instrument for measurement of the generated load at 50% compression and the absorption energy at 50% compression.

Instead of a clamp, a compression test flat plate (lower side) 3 (stainless) was attached. The attachment position of the flat plate was a position so that the gap between the upper side and lower side compression test flat plates at the minimum position of the crosshead becomes 15 mm. Refer to FIG. 5. In FIG. 5, 4 is a support, 5 is a test piece, and 6 is a tap.

Measurement method: The test piece was length 35 mm×width 35 mm×height 35 mm and all surfaces had no skin. Before testing, the article temperature was stabilized by storing for 16 hours or more in −35° C.±2° C., 23° C.±2° C., and 65° C.±2° C. environments. The constant temperature bath attached to the GRC 8250 was adjusted to each of the test temperatures of −35° C.±2° C., 23° C.±2° C., and 65° C.±2° C., the test piece was placed on a compression test fiat plate (lower side), and the test was carried out by causing the tap in which the tip has been changed to compression flat plate (upper side) to fall thereon under the conditions of a test rate of 3.01 m/see, a test load of 3.19 kg, and a falling weight distance of 46 cm.

Using the analysis software Impulse Data Acquisition, the cursor on the measurement chart was manually adjusted to a displacement of 17. 5 mm, and the values of load and absorption energy displayed on the upper right and the upper left of the chart were read, and these are taken as the generated load at 50% compression and absorption energy at 50% compression. The average of 5 tests was calculated.

The ratio $Q_{-35}/Q_{23}$ of the obtained generated loads at 50% compression $Q_{-35}$ and $Q_{23}$, and the ratio $Q_{65}/Q_{23}$ of $Q_{65}$ and $Q_{23}$, and also the ratio $E_{-35}/E_{23}$ of the obtained absorption energies at 50% compression E-35 and E23, and the ratio $E_{65}/E_{23}$ of $E_{65}$ and $E_{23}$ were evaluated based on the following standards (standard A for Examples 1a to 13a and Comparative Examples 1a to 5a, and standard B for Examples 1b to 14b and Comparative Examples 1b to 4b).

Standard A $Q_{-35}/Q_{23}$ and $E_{-35}/E_{23}$

○ (good): Ratio of less than 1.20

Δ (acceptable): Ratio in the range of 1.20 or more and less than 1.22

× (unacceptable): Ratio of 1.22 or more $Q_{65}/Q_{23}$ and $E_{65}/E_{23}$

○ (good): Ratio of 0.80 or more

Δ (acceptable): Ratio in the range of 0.77 or more and less than 0.80

× (unacceptable): Ratio of less than 0.77

Standard B $Q_{-35}/Q_{23}$ and $E_{-35}/E_{23}$

○ (good): Ratio of 1.20 or less

× (unacceptable): Ratio of larger than 1.20

$Q_{65}/Q_{23}$ and $E_{65}/E_{23}$

○ (good): Ratio of 0.80 or more

× (unacceptable): Ratio of less than 0.80

<Falling Ball Impact Value of Expanded Molded Article>

The falling ball impact strength was measured in accordance with the method described in JIS K7211: 1976 "General Rules for Testing Impact Strength of Rigid Plastics by The Falling Weight Method".

After the obtained expanded molded article was dried at a temperature of 50° C. for 1 day, a test piece (6 surfaces having no skin) of 40 mm×215 mm×20 mm (thickness) was cut from this expanded molded article.

Subsequently, both ends of the test piece were fixed using clamps so that the space between fulcrums is 150 mm, a steel ball weighing 321 g was made to fail from a predetermined height onto the center portion of the test piece, and the presence/absence of breakage of the test piece was observed.

The test was conducted with the rigid ball falling height (test height) being changed at intervals of 5 cm from the minimum height for all of the 5 test pieces to be broken to the maximum height for none of the test pieces to be broken, and the falling ball impact value (cm), in other words, the 50% breaking height, was calculated from the following calculation formula.

$$H_{50}=H_i+d[\Sigma(i\cdot n_i)/N\pm 0.5]$$

The symbols in the formula mean the following.

$H_{50}$: 50% breaking height (cm)

$H_i$: Test height (cm) when the height level (i) is 0 and the height from which the test piece is expected to be broken d: Height interval (cm) when the test height is elevated or lowered i: Height level which increases or decreases one by one (i=. . . −3, −2, −1, 0, 1, 2, 3 . . . ) with the height level at Hi being 0 m: Number of test pieces broken (or not broken) at each level, for which data of the greater number is used (if the numbers are the same, either may be used)

N: Total number ($N=\Sigma n_i$) of test pieces broken (or not broken) at each level, for which data of the greater number is used (if the numbers are the same, either may be used)

±0.5: A negative number is employed when data of broken test pieces is used and a positive number is employed when data of not-broken test pieces is used The obtained falling ball impact value was evaluated by the following standards (standard A for Examples la to 1.3a and Comparative Examples 1a to 5a, and standard B for Examples 1b to 14b and Comparative Examples 1b to 4b). A larger falling ball impact value shows larger impact resistance of the expanded molded article.

Standard A

Φ (superior): Falling ball impact value of 40 cm or more

○ (good): Falling ball impact value in the range of 30 cm or more and less than 40cm Δ (acceptable): Falling ball impact value in the range of 25 cm or more and less than 30 cm ×(unacceptable): Falling ball impact value of less than 25 cm Standard B ○ (good): Falling ball impact value of 35 cm or more Δ (acceptable): Falling ball impact value in the range of 30 cm or more and less than 35 cm × (unacceptable): Falling ball impact value of less than 30 cm <Compression Strength of Expanded Molded Article>

This was measured by the method described in JIS K6767: 1999 "Cellular Plastics-Polyethylene-Methods of Test". That is, Tensilon Universal Tester UCT-10T (manufactured by Orientech Co., Ltd) and Universal Tester Data Processor UTPS-237(manufactured by Softbrain Co., Ltd.) were used, the test piece size was 50×50×thickness 25 mm, and the compression rate was 10.0 mm/min (the displacement speed per 1 minute is a speed as close as possible to 50% of the thickness of the test piece). The compression stress at 10% compression of the thickness was measured. The number of test pieces was 3, and after conditioning over 16 hours under a reference atmosphere of symbol "23/50" (temperature of 23° C. and relative humidity of 50%) and grade 2 of JIS K7100: 1999 "Plastics-Standard Atmospheres for Conditioning and Testing", measurement was carried out under the same reference atmosphere.

The compression stress was calculated by the following formula, $$\sigma_{10}=F_{10}/A_0$$

$\sigma_{10}$: Compression stress (MPa)

$F_{10}$: Load (N) at 10% deformation $A_0$: Initial cross-sectional area ($mm^2$) of test piece <Bending Strength and Bending Fracture Point Displacement of Expanded Molded Article>

The bending strength and bending fracture point displacement were measured by the method described in JIS K7221-2: 1999 "Rigid Cellular Plastics-Determination of Flexural Properties—Part 2: Determination of Flexural Strength and Apparent Flexural Modulus of Elasticity". That is, using a Tensilon Universal Tester UCT-10T (manufactured by Orientech Co., Ltd) and Universal Tester Data Processor UTPS-237 (manufactured by Softbrain Co., Ltd.), a test piece size of 75 mm×300 mm×thickness 25 mm (there is only skin on the pressurized surface side), and under the conditions of a test rate of 10.0 mm/min, a pressing wedge 10R, a support base 10R, and a distance between fulcrums of 200 mm, the bending strength was measured by applying pressure so that the surface of the test piece having no skin extended. The number of test pieces was 5, and after conditioning over 16 hours under a reference atmosphere of symbol "23/50" (temperature of 23° C. and relative humidity of 50%) and grade 2 of JIS K7100: 1999 "Plastics-Standard Atmospheres for Conditioning and Testing", measurement was carried out under the same reference atmosphere.

The bending strength (MPa) was calculated by the following formula.

$$R=(1.5\ F_R\times L/bd^2)\times 10^3$$

R: Bending strength (MPa)

$F_R$: Maximum load (kN)

L: Distance between fulcrums (mm)

b: Width of test piece (mm)

d: Thickness of test piece (mm)

In this test, the fracture detection sensitivity was set at 0.5% and when the decrease thereof exceeds a set value 0.5% (deflection: 30 mm) compared to a direetly-before load sampling point, the directly-before sampling point is measured as the bending fracture point displacement (mm), and the average of 5 tests was determined.

The obtained bending fracture point displacement was evaluated by the following standards (standard A for Examples 1a to 13a and Comparative Examples 1a to 5a, and standard B for Examples 1b to 14b and Comparative Examples 1b to 4b). A larger bending fracture point displacement shows larger resilience of the expanded molded article.

Standard A

Φ (superior): Bending fracture point displacement of 40 mm or more

○ (good): Bending fracture point displacement in the range of 30 mm or more and less than 40 mm Δ (acceptable): Bending fracture point displacement in the range of 20 mm or more and less than 30 mm × (unacceptable): Bending fracture point displacement of less than 20 mm Standard B ○ (good): Bending fracture point displacement of 28 mm or more Δ (acceptable): Bending fracture point displacement in the range of 25 mm or more and less than 28 mm × (unacceptable): Bending fracture point displacement of less than 25 mm <Evaluation of Recyclability>

Regarding the evaluation of recyclability, after pulverizing the obtained expanded molded article by a pulverizer, the number of times strands were cut per 1 hour when charged into an extruder (compression kneading single screw extruder: CER40Y3.7MB-SX, manufactured by Hoshi Plastic, perforated plate: ø2 mm×1 hole) was measured, and 5 or more times/1 hour is taken to be × and less than 5 times/1 hour is taken to be ○.

Example 1a 100 parts by mass of a first polyethylene-based resin (high-density polyethylene: manufactured by Japan Polyethylene Corporation, product name: NOVATEC HD, product number: HY540), 233 parts by mass of a second polyethylene-based resin (linear low-density polyethylene LLDPE: manufactured by Japan Polyethylene Corporation, product name: HARMOREX, product number: NF444A), and 36.7 parts by mass of a carbon black master batch (manufactured by The Dow Chemical Company Japan, product name: 28E-40) were charged into a tumbler mixer and mixed for 10 minutes.

Subsequently, this resin mixture was supplied to a single screw extruder (model: CER40Y3.7MB-SX, manufactured by Hoshi Plastic, aperture: 40 mm dice plate (aperture: 1.5 mm)), melt kneaded at a temperature of 230 to 250° C., and cut into a cylindrical shape of 0.40 to 0.60 mg/piece (average: 0.5 mg/piece) with a fan cutter (manufactured by Hoshi Plastic, model: FCW-110B/SE1-N) by a strand cut technique, to obtain seed particles formed from a polyethylene-based resin.

Next, 30 g of magnesium pyrophosphate, 0.15 g of sodium dodecylbenzenesulfonate, and 1.9 kg of demineralized water were dispersed in a 5 L autoclave equipped with a stirrer, to obtain a dispersion medium.

600 g of the aforementioned seed particles were dispersed in the dispersion medium at 30° C., this was held thereat for 10 minutes, and then the temperature was raised to 60° C., to obtain a suspension.

Furthermore, 200 g of styrene monomer having 0.44 g of dicumyl peroxide as a polymerization initiator dissolved therein was added dropwise to this suspension over 30minutes. This was held thereat for 60 minutes after the dropwise addition so as to impregnate the styrene monomer into the high-density polyethylene-based resin particles. After impregnation, the temperature was raised to 130° C., and was polymerized (first polymerization) at this temperature for 2 hours.

Next, after charging an aqueous solution in which 0.65 g of sodium dodecylbenzenesulfonate has been dissolved in 0.1 kg of demineralized water into the suspension reduced to 120° C., 1,200 g of styrene monomer having 5.0 g of dicumyl peroxide dissolved therein was added dropwise thereto over 5 hours. The total amount of styrene monomer was 233 parts by mass with respect to 100 parts by mass of seed particles. After the dropwise addition, 6.0 g of ethylene bis-stearic acid amide as a cell regulator was charged thereinto and this was held at 120° C. for 1 hour so as to impregnate the styrene monomer into the high-density polyethylene-based resin particles. After impregnation, the temperature was raised to 140° C. and was held at this temperature for 2 hours to polymerize (second polymerization). As a result of this polymerization, composite resin particles were able to be obtained.

Subsequently, the reaction liquid was cooled to 80° C. or less and the composite resin particles were removed from the autoclave. 2 kg of the composite resin particles, 2 L of water, and 0.50 g of sodium dodecylbenzenesulfonate were inserted into a 5 L autoclave equipped with a stirrer. Furthermore, 520 mL (300 g) of butane (n-butane:isobutane=7:3(mass ratio)) as a blowing agent was inserted into the autoclave. Next, by raising the temperature to 70° C. and stirring continuously for 3 hours, expandable particles were able to be obtained.

Thereafter, the mixture was cooled to 30° C. or less and the expandable particles were removed from the autoclave, and then dehydrated and dried.

Next, the obtained expandable particles were pre-expanded to a bulk density of 50 kg/m$^3$, to obtain pre-expanded particles. After the obtained pre-expanded particles were left to stand at room temperature (23° C.) for 1 day, the pre-expanded particles were inserted into a molding cavity having a size of 400 mm×300 mm×30 mm. Thereafter, this was heated by introducing 0.15 MPa of steam for 50 seconds into the molding cavity. Subsequently this was cooled until the surface pressure of the expanded molded article was reduced to 0.01 MPa, to obtain an expanded molded article having a density of 50 $kg/m^3$.

The appearance and fusion of the obtained expanded molded article were both good.

Example 2a

Other than changing the bulk density and density to 33.3 $kg/m^3$, an expanded molded article was obtained in the same manner as Example 1a. The appearance and fusion of the obtained expanded molded article were both good.

Example 3a

Other than changing the first polyethylene-based resin to Evolue H SP3510 manufactured by Prime Polymer Co., Ltd., changing the added amounts of the second polyethylene-based resin and carbon black master batch to 100 parts by mass and 22 parts by mass respectively, and changing the adjustment pressure at the time of molding to 0.11MPa, an expanded molded article was obtained in the same manner as Example 2a. The appearance and fusion of the obtained expanded molded article were both good.

Example 4a

Other than changing the mass ratio of the seed particles and the total amount of styrene monomer to 100:400 (amount of seed particles is 440 g, and amounts of styrene monomer in first polymerization and second polymerization are 145 g and 1,415 g respectively), changing the amounts of dicumyl peroxide as the polymerization initiator to 0.32 g and 5.82 g respectively adding the styrene monomer of the second polymerization dropwise over 5 hours, and changing the bulk density and density to 25.0 $kg/m^3$, an expanded molded article was obtained in the same manner as Example 3a. The appearance and fusion of the obtained expanded molded article were both good.

Comparative Example 1a

Other than not using the first polyethylene-based resin and changing the added amount of the carbon black master batch to 11 parts by mass, an expanded molded article was obtained in the same manner as Example 1a. The appearance and fusion of the obtained expanded molded article were both good.

Comparative Example 2a

Other than changing the second polyethylene-based resin to product number: KERNEL KF270 manufactured by Japan Polyethylene Corporation, and changing the bulk density and density to 33,3 $kg/m^3$, an expanded molded article was obtained in the same manner as Comparative Example 1a. The appearance and fusion of the obtained expanded molded article were both good.

Comparative Example 3a

Other than not using the first polyethylene-based resin and changing the added amount of the carbon black master batch to 11 parts by mass, an expanded molded article was obtained in the same manner as Example 4a. The appearance and fusion of the obtained expanded molded article were both good.

Example 5a

[Preparation of Modified Hectorite]

After adding 3 L of ethanol and 100 ml of 37% concentrated hydrochloric acid to 3 L of water, 330 g (1.1 mol) of N,N-dimethyl-octadecylamine was added to the obtained solution and then this was heated to 60° C., to prepare a hydrochloride solution. 1 kg of hectorite was suspended in this solution. After stirring this suspension at 60° C. for 3 hours and removing the supernatant, the remainder was washed in 50 L of water at 60° C. Thereafter, this was dried at 60° C. and 103 torr for 24 hours, and then pulverized by a jetmill, to obtain a modified hectorite having an average particle diameter of 5.2 μm.

[Preparation of Polymerization Catalyst (p)]

500 g of the aforementioned modified hectorite was suspended in 1.7 L of hexane, a mixture of 8.45 g (20.0 mmol) of 1,1,3,3-tetramethyldisiloxane-1,3-diyl-bis(cyclopentadienyl)zirconium dichloride and 2.8 L (2 mol) of a hexane solution of triisobutylaluminum (0.714 M) was added thereto, and then stirred at 80° C. for 3 hours. Thereafter, 2.38 g (3.53 mmol) of diphenyl(1-cyclopentadienyl)(2,7-di-tert-butyl-9-fluorenyl)zirconium dichloride, which amount corresponds to 15 mol % of the 1,1,3,3-tetramethyldisiloxane-1,3-diyl-bis(cyclopentadienyl)zirconium dichloride was added, and then stirred at room temperature for 6 hours. This was left to stand and the supernatant was removed therefrom. A hexane solution of triisobutylaluminum (0.15 M) was added to the remainder, to ultimately obtain 100 g/L of a catalyst slurry.

[Preparation of Polymerization Catalyst (q)]

500 g of the aforementioned modified hectorite was suspended in 1.7 L of hexane, a mixture of 6.63 g (20.0 mmol) of propane-1,3-diyl-bis(cyclopentadienyl)zirconium dichloride and 2.8 L (2 mol) of a hexane solution of triisobutylaluminum (0.714 M) was added thereto, and then stirred at 60° C. for 3 hours. Thereafter, 0.58 g (1.05 mmol) of diphenylmethylene(l-cyclopentadienyl)(9-fluorenyl)zirconium dichloride, which amount corresponds to 5 mol% of the propane-1,3-diyl-bis(cyclopentadienyl)zirconium dichloride was added, and then stirred at room temperature for 6 hours. This was left to stand and the supernatant was removed therefrom. A hexane solution of triisobutylaluminum (0.15 M) was added to the remainder, to ultimately obtain 100 g/L of a catalyst slurry.

[Production of Polyethylene-Based Resin]

300 L of hexane and 1.6 L of 1-butene were introduced into a polymerization vessel having an inner volume of 540 L and the internal temperature of the autoclave was raised to 80° C. 74 mL of the aforementioned Polymerization Catalyst (p) and 125 mL of the aforementioned Polymerization Catalyst (q) were added to this autoclave and an ethylene/hydrogen mixed gas (containing hydrogen: 1,500 ppm) was introduced into the autoclave until the partial pressure reached 0.9 MPa to initiate polymerization. During the polymerization, the ethylene/hydrogen mixed gas was continuously introduced so that the partial pressure was maintained at 0.9 MPa. Also, the polymerization temperature was controlled to 80° C. 90 minutes after the initiation of polymerization, the inner pressure of the polymerization vessel was released, and the content was filtered and dried, to obtain 54 kg of a powder of the first polyethylene-based resin. The obtained powder was melt-kneaded using a single-screw extruder with a 50 mm diameter set at 200° C. and pelletized, to obtain first polyethylene-based resin pellets.

[Production of Composite Resin Particles]

Other than changing to 100 parts by mass of the aforementioned obtained first polyethylene-based resin pellets, 11 parts by mass of the second polyethylene-based resin (linear low-density polyethylene LLDPE: manufactured by Japan Polyethylene Corporation, product name: HARMOREX, product number: NF444A), and 0 parts by weight of the carbon black master batch, changing the mass ratio of the seed particles and the total amount of styrene monomer to 100:150 (seed particles amount is 760 g, and styrene monomer amounts of first polymerization and second polymerization are 250 g and 990 g respectively), changing the amounts of dicumyl peroxide as the polymerization initiator to 0.55 g and 4.46 g respectively, adding the styrene monomer of the second polymerization dropwise over 4 hours and 30 minutes, and changing the adjustment pressure when molding to 0.10 MPa, an expanded molded article was obtained in the same manner as Example 1. The appearance and fusion of the obtained expanded molded article were both good.

Example 6a

Other than changing the bulk density and density to 33.3 $kg/m^3$, an expanded molded article was obtained in the same manner as Example 5a. The appearance and fusion of the obtained expanded molded article were both good.

Example 7a

Other than changing the first polyethylene-based resin to product name: TOSOH-HMS, grade name: 10S65B manufactured by Tosoh Corporation and changing the added amount of the second polyethylene-based resin to 43 parts by mass, an expanded molded article was obtained in the same manner as Example 5a. The appearance and fusion of the obtained expanded molded article were both good.

Example 8a

Other than changing the bulk density and density to 33.3 $kg/m^3$, an expanded molded article was obtained in the same manner as Example 7a. The appearance and fusion of the obtained expanded molded article were both good.

Example 9a

Other than changing the first polyethylene-based resin to product name: TOSOH-HMS, grade name: 09S53B manufactured by Tosoh Corporation, changing the second polyethylene-based resin to product name: KERNEL, product number: KF270 manufactured by Japan Polyethylene Corporation, and changing the added amount of the second polyethylene-based resin to 67 parts by mass, an expanded molded article was obtained in the same manner as Example 8a. The appearance and fusion of the obtained expanded molded article were both good.

Comparative Example 4a

Other than not using the first polyethylene-based resin, an expanded molded article was obtained in the same manner as Example 5a. The appearance and fusion of the obtained expanded molded article were both good.

Comparative Example 5a

Other than changing the bulk density and density to 33.3 $kg/m^3$, an expanded molded article was obtained in the same manner as Comparative Example 4a. The appearance and fusion of the obtained expanded molded article were both good.

Example 10a

Other than changing the first polyethylene-based resin to product name: TOSOH-HMS, grade name: 10S65B manufactured by Tosoh Corporation, changing the added amounts of the second polyethylene-based resin and carbon black master batch to 25 parts by mass and 13.8 parts by mass respectively, and changing the adjustment pressure at the time of molding to 0.11 MPa, an expanded molded article was obtained in the same manner as Example 1a. The appearance and fusion of the obtained expanded molded article were both good.

Example 11a

Other than changing the bulk density and density to 33.3 $kg/m^3$, an expanded molded article was obtained in the same manner as Example 10a. The appearance and fusion of the obtained expanded molded article were both good.

Example 12a

Other than changing the first polyethylene-based resin to product name: TOSOH-HMS, grade name: CK57 manufactured by Tosoh Corporation, changing the second polyethylene-based resin to product name: KERNAL. product number: KF270manufactured by Japan Polyethylene Corporation, and changing the added amounts of the second polyethylene-based resin and carbon black master batch to 150 parts by mass and 22 parts by mass respectively, and changing the adjustment pressure at the time of molding to 0.15 MPa, an expanded molded article was obtained in the same manner as Example 11a. The appearance and fusion of the obtained expanded molded article were both good.

Example 13a

Other than changing the second polyethylene-based resin to product name: HARMOREX, product number: NF444A manufactured by Japan Polyethylene Corporation, changing the added amounts of the second polyethylene-based resin and carbon black master batch to 233 parts by mass and 36.7 parts by mass respectively, and changing the bulk density and density to 25,0 $kg/m^3$, an expanded molded article was obtained in the same manner as Example 12a. The appearance and fusion of the obtained expanded molded article were both good.

In Tables 1 to 9, HOPE, LLDPE, PS, and MB mean high-density polvethylene-based resin (first polyethylene-based resin), linear low-density polyethylene-based resin (second polyethylene-based resin), polystyrene, and master batch respectively.

TABLE 1

| | | Resin No. | Density kg/m$^3$ | MFR g/10 min | Melting Point ° C. | Mz ×10$^3$ | Mw ×10$^3$ | Mn ×10$^3$ | Mz/Mn | Mw/Mn | Crystallization Calorific Value mJ/mg | TREF No of peaks |
|---|---|---|---|---|---|---|---|---|---|---|---|---|
| First PE HDPE | NOVATEC HD HY540 manufactured by Japan Polyethylene Corporation | 1 | 960 | 1.0 | 135 | 1,980 | 308 | 42 | 47.1 | 7.3 | 228 | 1 |
| | Evolue H SP3510 manufactured by Prime Polymer Co., Ltd. | 2 | 934 | 0.5 | 126 | 674 | 254 | 58 | 11.6 | 4.4 | 156 | 1 |
| | PE synthesized in Example 5a | 3 | 937 | 8.0 | 124 | 788 | 162 | 31 | 25.4 | 5.2 | 183 | 2 |
| | TOSOH-HMS grade name: 10S65B manufactured by Tosoh Corporation | 4 | 940 | 2.0 | 126 | 1,040 | 233 | 48 | 21.7 | 4.8 | 172 | 2 |
| | TOSOH-HMS grade name: CK57 manufactured by Tosoh Corporation | 5 | 950 | 4.0 | 126 | 1,215 | 219 | 26 | 46.6 | 8.3 | 189 | 2 |
| | TOSOH-HMS grade name: 09S53B manufactured by Tosoh Corporation | 6 | 936 | 2.6 | 123 | 1,142 | 205 | 29 | 39.4 | 7.1 | 169 | 2 |
| Second PE LLDPE | HARMOREX NF444A manufactured by Japan Polyethylene Corporation | A | 912 | 2.0 | 121 | 357 | 191 | 75 | 4.7 | 2.5 | 116 | — |
| | KERNEL KF270 manufactured by Japan Polyethylene Corporation | B | 907 | 2.0 | 100 | 323 | 187 | 84 | 3.8 | 2.2 | 85 | — |

TABLE 2

| | | | | Examples | | | | Comparative Examples | | |
|---|---|---|---|---|---|---|---|---|---|---|
| | | | | 1a | 2a | 3a | 4a | 1a | 2a | 3a |
| | | HDPE/LLDPE ratio | | 30/70 | 30/70 | 50/50 | 50/50 | 0/100 | 0/100 | 0/100 |
| | | Seed particles/PS ratio | | 3/7 | 3/7 | 3/7 | 2/8 | 3/7 | 3/7 | 2/8 |
| Seed Particles | HDPE | NOVATEC HD HY540 manufactured by Japan Polyethylene Corporation | pbm | 100 | 100 | 0 | 0 | 0 | 0 | 0 |
| | | Evolue H SP3510 manufactured by Prime Polymer Co., Ltd. | pbm | 0 | 0 | 100 | 100 | 0 | 0 | 0 |
| | LLDPE | HARMOREX NF444A manufactured by Japan Polyethylene Corporation | pbm | 233 | 233 | 100 | 100 | 100 | 0 | 100 |
| | | KERNEL KF270 manufactured by Japan Polyethylene Corporation | pbm | 0 | 0 | 0 | 0 | 0 | 100 | 0 |
| | Carbon black MB | 28E-40 manufactured by The Dow Chemical Company Japan | pbm | 36.7 | 36.7 | 22 | 22 | 11 | 11 | 11 |
| Composite | | Seed particles | pbm | 100 | 100 | 100 | 100 | 100 | 100 | 100 |
| Resin | | PS | pbm | 233 | 233 | 233 | 400 | 233 | 233 | 400 |
| Particles | | Gel fraction | wt. % | 0.8 | 0.8 | 0.7 | 0.7 | 22.2 | 13.2 | 3.0 |
| | | Average particle diameter | mm | 1.31 | 1.31 | 1.30 | 1.55 | 1.30 | 1.30 | 1.57 |
| Pre-Expanded | | Mz | ×10$^3$ | 903 | 903 | 710 | 740 | 726 | 621 | 887 |
| Particles | | Mw | ×10$^3$ | 434 | 434 | 356 | 321 | 307 | 284 | 418 |
| Expanded | | Expansion ratio | Times | 20 | 30 | 30 | 40 | 20 | 30 | 40 |
| Molded Article | | Density | kg/m$^3$ | 50.0 | 33.3 | 33.3 | 25.0 | 50.0 | 33.3 | 25.0 |

pbm: parts by mass

TABLE 3

| | | | | Examples | | | | | Comparative Examples | |
|---|---|---|---|---|---|---|---|---|---|---|
| | | | | 5a | 6a | 7a | 8a | 9a | 4a | 5a |
| | | HDPE/LLDPE ratio | | 90/10 | 90/10 | 70/30 | 70/30 | 60/40 | 0/100 | 0/100 |
| | | Seed particles/PS ratio | | 4/6 | 4/6 | 4/6 | 4/6 | 4/6 | 4/6 | 4/6 |
| Seed Particles | HDPE | PE synthesized in Example 5a | pbm | 100 | 100 | 0 | 0 | 0 | 0 | 0 |
| | | TOSOH-HMS grade name: 10S65B manufactured by Tosoh Corporation | pbm | 0 | 0 | 100 | 100 | 0 | 0 | 0 |
| | | TOSOH-HMS grade name: 09S53B manufactured by | pbm | 0 | 0 | 0 | 0 | 100 | 0 | 0 |

TABLE 3-continued

| | | | | Examples | | | | | Comparative Examples | |
|---|---|---|---|---|---|---|---|---|---|---|
| | | | | 5a | 6a | 7a | 8a | 9a | 4a | 5a |
| | LLDPE | Tosoh Corporation HARMOREX NF444A manufactured by Japan Polyethylene Corporation | pbm | 11 | 11 | 43 | 43 | 0 | 100 | 100 |
| | | KERNEL KF270 manufactured by Japan Polyethylene Corporation | pbm | 0 | 0 | 0 | 0 | 67 | 0 | 0 |
| Composite | | Seed particles | pbm | 100 | 100 | 100 | 100 | 100 | 100 | 100 |
| Resin | | PS | pbm | 150 | 150 | 150 | 150 | 150 | 150 | 150 |
| Particles | | Gel fraction | wt. % | 0.8 | 0.8 | 0.9 | 0.9 | 1.2 | 23.2 | 23.2 |
| | | Average particle diameter | mm | 1.27 | 1.27 | 1.26 | 1.26 | 1.27 | 1.27 | 1.27 |
| Pre-Expanded | | Mz | $\times 10^3$ | 635 | 635 | 932 | 932 | 712 | 901 | 901 |
| Particles | | Mw | $\times 10^3$ | 299 | 299 | 422 | 422 | 358 | 433 | 433 |
| Expanded | | Expansion ratio | Times | 20 | 30 | 20 | 30 | 30 | 20 | 30 |
| Molded Article | | Density | $kg/m^3$ | 50.0 | 33.3 | 50.0 | 33.3 | 33.3 | 50.0 | 33.3 |

pbm: parts by mass

TABLE 4

| | | | | Examples | | | |
|---|---|---|---|---|---|---|---|
| | | | | 10a | 11a | 12a | 13a |
| | | HDPE/LLDPE ratio | | 80/20 | 80/20 | 40/60 | 30/70 |
| | | Core rosin/PS ratio | | 3/7 | 3/7 | 3/7 | 3/7 |
| Seed Particles | HDPE | TOSOH-HMS grade name: 10S65B manufactured by Tosoh Corporation | pbm | 100 | 100 | 0 | 0 |
| | | TOSOH-HMS grade name: CK57 manufactured by Tosoh Corporation | pbm | 0 | 0 | 100 | 100 |
| | LLDPE | HARMOREX NF444A manufactured by Japan Polyethylene Corporation | pbm | 25 | 25 | 0 | 233 |
| | | KERNEL KF270 manufactured by Japan Polyethylene Corporation | pbm | 0 | 0 | 150 | 0 |
| | Carbon black MB | 28E-40 manufactured by The Dow Chemical Company Japan | pbm | 13.8 | 13.8 | 22 | 36.7 |
| Composite | | Seed particles | pbm | 100 | 100 | 100 | 100 |
| Resin | | PS | pbm | 233 | 233 | 233 | 233 |
| Particles | | Gel fraction | wt. % | 0.8 | 0.8 | 1.2 | 1.6 |
| | | Average particle diameter | mm | 1.31 | 1.31 | 1.30 | 1.32 |
| Pre-Expanded | | Mz | $\times 10^3$ | 712 | 712 | 720 | 901 |
| Particles | | Mw | $\times 10^3$ | 358 | 358 | 348 | 433 |
| Expanded | | Expansion Ratio | Times | 20 | 30 | 30 | 40 |
| Molded Article | | Density | $kg/m^3$ | 50.0 | 33.3 | 33.3 | 25.0 |

pbm: parts by mass

TABLE 5

| | | | | | Examples | | | | Comparative Examples | | |
|---|---|---|---|---|---|---|---|---|---|---|---|
| | | | | | 1a | 2a | 3a | 4a | 1a | 2a | 3a |
| Temperature | Generated | −35° C. | $Q_{-35}$ | N | 551 | 384 | 363 | 366 | 576 | 439 | 366 |
| Dependence | Load at 50% | 23° C. | $Q_{23}$ | N | 467 | 329 | 298 | 313 | 468 | 344 | 313 |
| | Compression | 65° C. | $Q_{65}$ | N | 360 | 259 | 229 | 245 | 357 | 263 | 239 |
| | | | $Q_{-35}/Q_{23}$ | Ratio/Evaluation | 1.18/○ | 1.17/○ | 1.22/Δ | 1.17/○ | 1.23/X | 1.28/X | 1.17/○ |
| | | | $Q_{65}/Q_{23}$ | Ratio/Evaluation | 0.77/Δ | 0.79/Δ | 0.77/Δ | 0.78/Δ | 0.76/X | 0.76/X | 0.76/X |
| | Absorption | −35° C. | $E_{-35}$ | J | 8.07 | 5.35 | 4.97 | 5.23 | 8.36 | 6.40 | 5.23 |
| | Energy at | 23° C. | $E_{23}$ | J | 6.84 | 4.52 | 4.11 | 4.39 | 6.81 | 4.91 | 4.39 |
| | 50% | 65° C. | $E_{65}$ | J | 5.27 | 3.53 | 3.20 | 3.39 | 5.18 | 3.69 | 3.35 |
| | Compression | | $E_{-35}/E_{23}$ | Ratio/Evaluation | 1.18/○ | 1.18/○ | 1.21/Δ | 1.19/Δ | 1.23/X | 1.30/X | 1.19/○ |
| | | | $E_{65}/E_{23}$ | Ratio/Evaluation | 0.77/Δ | 0.78/Δ | 0.78/Δ | 0.77/Δ | 0.76/X | 0.75/X | 0.76/X |

TABLE 5-continued

| | | Examples 1a | 2a | 3a | 4a | Comparative Examples 1a | 2a | 3a |
|---|---|---|---|---|---|---|---|---|
| Falling Ball Impact Value | cm/Evaluation | 73.5/Θ | 69.5/Θ | 60.5/Θ | 50.5/Θ | 85.5/Θ | 78.5/Θ | 66.5/Θ |
| Compression Strength | MPa | 0.34 | 0.23 | 0.25 | 0.20 | 0.32 | 0.24 | 0.16 |
| Bending Strength | MPa | 0.65 | 0.44 | 0.47 | 0.45 | 0.69 | 0.63 | 0.38 |
| Bending Fraction Point Displacement | mm/Evaluation | 59.2/Θ | 62.0/Θ | 53.1/Θ | 43.5/Θ | 74.9/Θ | 60.0/Θ | 53.5/Θ |
| Recyclability | Evaluation | ○ | ○ | ○ | ○ | X | X | ○ |

TABLE 6

| | | | | Examples 5a | 6a | 7a | 8a | 9a | Comparative Examples 4a | 5a |
|---|---|---|---|---|---|---|---|---|---|---|
| Temperature Dependence | Generated Load at 50% Compression | −35° C. | $Q_{-35}$ N | 546 | 349 | 496 | 307 | 244 | 436 | 273 |
| | | 23° C. | $Q_{23}$ N | 457 | 307 | 438 | 291 | 225 | 398 | 233 |
| | | 65° C. | $Q_{65}$ N | 406 | 251 | 374 | 246 | 188 | 302 | 178 |
| | | $Q_{-35}/Q_{23}$ | Ratio/Evaluation | 1.19/○ | 1.14/○ | 1.13/○ | 1.05/○ | 1.08/○ | 1.10/○ | 1.17/○ |
| | | $Q_{65}/Q_{23}$ | Ratio/Evaluation | 0.89/○ | 0.82/○ | 0.85/○ | 0.85/○ | 0.84/○ | 0.76/X | 0.76/X |
| | Absorption Energy at 50% Compression | −35° C. | $E_{-35}$ J | 8.13 | 4.91 | 7.10 | 4.29 | 3.50 | 6.14 | 3.97 |
| | | 23° C. | $E_{23}$ J | 6.81 | 4.26 | 6.16 | 4.00 | 3.18 | 5.63 | 3.28 |
| | | 65° C. | $E_{65}$ J | 6.05 | 3.44 | 5.24 | 3.31 | 2.65 | 4.15 | 2.49 |
| | | $E_{-35}/E_{23}$ | Ratio/Evaluation | 1.19/○ | 1.15/○ | 1.15/○ | 1.07/○ | 1.10/○ | 1.09/○ | 1.21/Δ |
| | | $E_{65}/E_{23}$ | Ratio/Evaluation | 0.89/○ | 0.81/○ | 0.85/○ | 0.83/○ | 0.84/○ | 0.74/X | 0.76/X |
| Falling Ball Impact Value | | | cm/Evaluation | 43.5/Θ | 35.5/○ | 62.5/Θ | 54.5/Θ | 64.5/Θ | 86.5/Θ | 73.5/Θ |
| Compression Strength | | | MPa | 0.36 | 0.17 | 0.35 | 0.19 | 0.18 | 0.24 | 0.15 |
| Bending Strength | | | MPa | 0.75 | 0.45 | 0.71 | 0.52 | 0.49 | 0.63 | 0.37 |
| Bending Fraction Point Displacement | | | mm/Evaluation | 24.7/Δ | 36.7/○ | 48.1/Θ | 55.6/Θ | 64.4/Θ | 61.3/Θ | 56.8/Θ |
| Recyclability | | | Evaluation | ○ | ○ | ○ | ○ | ○ | X | X |

TABLE 7

| | | | | Example 10a | 11a | 12a | 13a |
|---|---|---|---|---|---|---|---|
| Temperature Dependence | Generated Load at 50% Compression | −35° C. | $Q_{-35}$ N | 518 | 348 | 325 | 293 |
| | | 23° C. | $Q_{23}$ N | 464 | 322 | 300 | 265 |
| | | 65° C. | $Q_{65}$ N | 406 | 267 | 249 | 223 |
| | | $Q_{-35}/Q_{23}$ | Ratio/Evaluation | 1.12/○ | 1.08/○ | 1.08/○ | 1.11/○ |
| | | $Q_{65}/Q_{23}$ | Ratio/Evaluation | 0.88/○ | 0.83/○ | 0.83/○ | 0.84/○ |
| | Absorption Energy at 50% Compression | −35° C. | $E_{-35}$ J | 7.60 | 5.06 | 4.80 | 4.19 |
| | | 23° C. | $E_{23}$ J | 6.74 | 4.45 | 4.22 | 3.78 |
| | | 65° C. | $E_{65}$ J | 5.86 | 3.72 | 3.53 | 3.20 |
| | | $E_{-35}/E_{23}$ | Ratio/Evaluation | 1.13/○ | 1.14/○ | 1.14/○ | 1.11/○ |
| | | $E_{65}/E_{23}$ | Ratio/Evaluation | 0.87/○ | 0.84/○ | 0.84/○ | 0.85/○ |
| Falling Ball Impact Value | | | cm/Evaluation | 43.5/Θ | 36.5/○ | 47.5/Θ | 40.5/Θ |
| Compression Strength | | | MPa | 0.32 | 0.22 | 0.21 | 0.18 |
| Bending Strength | | | MPa | 0.81 | 0.46 | 0.48 | 0.40 |
| Bending Fraction Point Displacement | | | mm/Evaluation | 33.5/○ | 39.5/○ | 45.6/Θ | 55.1/Θ |
| Recyclability | | | Evaluation | ○ | ○ | ○ | ○ |

The following is understood from Tables 5 to 7.

From the examples, it is understood that composite resin particles including a medium-density to high-density first polyethylene-based resin in the range of 925 to 965kg/$m^3$ and a second polyethylene-based resin which is linear and which has a density lower than the first polyethylene -based resin, can obtain an expanded molded article having small temperature dependency of mechanical properties and high falling ball impact value, compression strength, bending strength, and bending fracture point displacement.

Example 1b

[Production of Composite Resin Particles]

100 parts by mass of first polyethylene-based resin pellets obtained in the same manner as Example 5a and 25 parts by mass of a second polyethylene -based resin (linear low-density polyethylene LLDPE: manufactured by Japan Polyethylene Corporation, product name: HARMOREX, product number: NF444A) were charged into a tumbler mixer, and mixed for 10 minutes.

Subsequently, this resin mixture was supplied to a single screw extruder (model: CER40Y3.7MB-SX, manufactured by Hoshi Plastic, aperture: 40 mm ø, dice plate (aperture: 1.5 mm)), melt kneaded at a temperature of 230 to 250° C., and cut into a cylindrical shape of 0.40 to 0.60 mg/piece (average: 0.5 mg/piece) with a fan cutter (manufactured by Hoshi Plastic, model: FCW-110B/SE1-N) by a strand cut technique, to obtain seed particles formed from a polyethylene -based resin.

Next, 20 g of magnesium pyrophosphate, 0.15 g of sodium dodecylbenzenesulfonate, and 1.9 kg of demineralized water were dispersed in a 5 L autoclave equipped with a stirrer, to obtain a dispersion medium.

760 g of the aforementioned seed particles were dispersed in the dispersion medium at 30° C., this was held thereat for 10 minutes, and then the temperature was raised to 60° C., to obtain a suspension.

Furthermore, 250 g of styrene monomer having 0.55 g of dicumyl peroxide as a polymerization initiator dissolved therein was added dropwise to this suspension over 30 minutes. This was held thereat for 60 minutes after the dropwise addition so as to impregnate the styrene monomer into the high-density polyethylene-based resin particles. After impregnation, the temperature was raised to 130° C., and was polymerized (first polymerization) at this temperature for 2 hours.

Next, after charging an aqueous solution in which 0.65 g of sodium dodecylbenzenesulfonate has been dissolved in 0.1 kg of demineralized water into the suspension reduced to 120° C., 990 g of styrene monomer having 4.46 g of dicumyl peroxide dissolved therein was added dropwise thereto over 4 hours and 30 minutes. The total amount of styrene monomer was 150 parts by mass with respect to 100 parts by mass of seed particles. After the dropwise addition, 6.0 g of ethylene bis-stearic acid amide as a cell regulator was charged thereinto and this was held at 120° C. for 1 hour so as to impregnate the styrene monomer into the high-density polyethylene-based resin particles. After impregnation, the temperature was raised to 140° C. and was held at this temperature for 3 hours to polymerize (second polymerization). As a result of this polymerization, composite resin particles were able to be obtained.

Subsequently, the reaction liquid was cooled to 30° C. or less and the composite resin particles were removed from the autoclave. 2 kg of the composite resin particles, 2 L of water, and 0.50 g of sodium dodecylbenzenesulfonate were inserted into a 5 L autoclave equipped with a stirrer. Furthermore, 520 mL (300 g) of butane (n-butane:isobutane=7:3(mass ratio)) as a blowing agent was inserted into the autoclave. Next, by raising the temperature to 70° C. and stirring continuously for 3 hours, expandable particles were able to be obtained.

Thereafter, the mixture was cooled to 30° C. or less and the expandable particles were removed from the autoclave, and then dehydrated and dried.

Next, the obtained expandable particles were pre-expanded to a bulk density of 50 kg/m$^3$ with steam, to obtain pre-expanded particles. After the obtained pre-expanded particles were left to stand at room temperature (23° C.) for 1 day, the pre-expanded particles were inserted into a molding cavity having a size of 400 mm×300 mm×30 mm.

Thereafter, this was heated by introducing 0.10 MPa of steam for 50 seconds into the molding cavity. Subsequently, this was cooled until the surface pressure of the expanded molded article was reduced to 0.01 MPa, to obtain an expanded molded article having a density of 50 kg/m$^3$.

The appearance and fusion of the obtained expanded molded article were both good.

Example 2b

Other than changing the bulk density and density to 33.3 kg/m$^3$, an expanded molded article was obtained in the same manner as Example 1b. The appearance and fusion of the obtained expanded molded article were both good.

Example 3b

Other than changing the first polyethylene-based resin to product name: TOSOH-HMS grade name: 10S65B manufactured by Tosoh Corporation, changing the added amount of the second polyethylene-based resin to 43 parts by mass, and adding 15.7 parts by mass of a carbon black master batch (manufactured by The Dow Chemical Company Japan, product name: 28E-40), an expanded molded article was obtained in the same manner as Example 1b. The appearance and fusion of the obtained expanded molded article were both good.

Example 4b

Other than changing the bulk density and density to 33.3 kg/m$^3$, an expanded molded article was obtained in the same manner as Example 3b. The appearance and fusion of the obtained expanded molded article were both good.

Example 5b

Other than changing the added amounts of the second polyethylene-based resin and carbon black master batch to 67 parts by mass and 18.3 parts by mass respectively, an expanded molded article was obtained in the same manner as Example 3b. The appearance and fusion of the obtained expanded molded article were both good.

Example 6b

Other than changing the bulk density and density to 33.3 kg/m$^3$, an expanded molded article was obtained in the same manner as Example 5b. The appearance and fusion of the obtained expanded molded article were both good.

Example 7b

Other than changing the second polyethylene-based resin to product name: KERNEL, product number: KF270 manufactured by Japan Polyethylene Corporation, and changing the added amounts of the second polyethylene-based resin and carbon black master batch to 100 parts by mass and 22 parts by mass respectively, an expanded molded article was obtained in the same manner as Example 3b. The appearance and fusion of the obtained expanded molded article were both good.

Example 8b

Other than changing the first polyethylene-based resin to product name: TOSOH-HMS, grade name: CK57 manufactured by Tosoh Corporation, changing the second polyethylene-based resin to product number: KERNEL KF270 manufactured by Japan Polyethylene Corporation, and changing the added amounts of the second polyethylene-based resin and carbon black master batch to 150 parts by mass and 27.5 parts by mass respectively, an expanded molded article was obtained in the same manner as Example 1b. The appearance and fusion of the obtained expanded molded article were both good.

Example 9b

Other than changing the added amounts of the second polyethylene-based resin and carbon black master batch to 233 parts by mass and 0 parts by mass respectively, an expanded molded article was obtained in the same manner as Example 7b. The appearance and fusion of the obtained expanded molded article were both good.

Example 10b

Other than changing the first polyethylene-based resin to product name: TOSOH-HMS, grade name: 10S65B manufactured by Tosoh Corporation, adding 13.8 parts by mass of a carbon black master batch (manufactured by The Dow Chemical Company Japan, product name: 28 E-40) changing the mass ratio of the seed particles and the total amount of styrene monomer to 100:233 (amount of seed particles is 600 g, and amounts of styrene monomer in first polymerization and second polymerization are 200 g and 1,200 g respectively), changing the amounts of dicumyl peroxide as the polymerization initiator to 0.44 g and 5.0 g respectively, and adding the styrene monomer of the second polymerization dropwise over 5 hours, an expanded molded article was obtained in the same manner as Example 1b. The appearance and fusion of the obtained expanded molded article were both good.

Example 11b

Other than changing the bulk density and density to 33.3 kg/m$^3$, an expanded molded article was obtained in the same manner as Example 10b. The appearance and fusion of the obtained expanded molded article were both good.

Example 12b

Other than changing the mass ratio of the seed particles and the total amount of styrene monomer to 100:233 (amount of seed particles is 600 g, and amounts of styrene monomer in first polymerization and second polymerization are 200 g and 1,200 g respectively), changing the amounts of dicumyl peroxide as the polymerization initiator to 0.44 g and 5.0 g respectively, and adding the styrene monomer of the second polymerization dropwise over 5 hours, an expanded molded article was obtained in the same manner as Example 7b. The appearance and fusion of the obtained expanded molded article were both good.

Example 13b

Other than changing the first polyethylene-based resin to product name: TOSOH-HMS, grade name: 09S53B manufactured by Tosoh Corporation, changing the mass ratio of the seed particles and the total amount of styrene monomer to 100:233 (amount of seed particles is 600 g, and amounts of styrene monomer in first polymerization and second polymerization are 200 g and 1,200 g respectively), changing the amounts of dicumyl peroxide as the polymerization initiator to 0.44 g and 5.0 g respectively, and adding the styrene monomer of the second polymerization dropwise over 5 hours, an expanded molded article was obtained in the same manner as Example 8b. The appearance and fusion of the obtained expanded molded article were both good.

Example 14b

Other than changing the first polyethylene-based resin to product name: TOSOH-HMS, grade name: 09S53B manufactured by Tosoh Corporation, an expanded molded article was obtained in the same manner as Example 11b. The appearance and fusion of the obtained expanded molded article were both good.

Comparative Example 1b

Other than not using the second polyethylene-based resin, an expanded molded article was obtained in the same manner as Example 1b. The appearance and fusion of the obtained expanded molded article were both good.

Comparative Example 2b

Other than changing the first polvethylene-based resin to product name: TOSOH-HMS, grade name: 10S65B manufactured by Tosoh Corporation used in Example 3b, adding 11 parts by mass of a carbon black master batch (manufactured by The Dow Chemical Company Japan, product name: 28E-40), and changing the bulk density and density to 33.3 kg/m$^3$, an expanded molded article was obtained in the same manner as Comparative Example 1b. The appearance and fusion of the obtained expanded molded article were both good.

Comparative Example 3b

Other than changing the mass ratio of the seed particles and the total amount of styrene monomer to 100:233 (amount of seed particles is 600 g, and amounts of styrene monomer in first polymerization and second polymerization are 200 g and 1,200 g respectively), changing the amounts of dicumyl peroxide as the polymerization initiator to 0.44 g and 5.0 g respectively, adding the styrene monomer of the second polymerization dropwise over 5 hours, and changing the bulk density and density to 50 kg/m$^3$, an expanded molded article was obtained in the same manner as Comparative Example 2b. The appearance and fusion of the obtained expanded molded article were both good.

Comparative Example 4b

Other than changing the first polyethylene-based resin to product name: TOSOH-HMS, grade name: 09S53B manufactured by Tosoh Corporation used in Example 13b, and changing the bulk density and density to 33.3 kg/m$^3$, an expanded molded article was obtained in the same manner as Comparative Example 3b. The appearance and fusion of the obtained expanded molded article were both good.

Various physical properties of the polyethylene-based resins used in the examples and comparative examples are shown in Table 8. Also, the amounts of used raw materials, gel fraction of composite resin particles, average particle diameter, Z-average molecular weight (Mz) and weight-average molecular weight (Mw) of the polystyrene-based resin, and the bulk expansion ration and bulk density of the expanded molded article for Examples 1b to 14b and Comparative Examples 1b to 4b are shown in Tables 9 and 10. The resin numbers in Tables 9 and 10 correspond to the resin numbers disclosed in Table 8. Furthermore, the measured results of the dynatap impact compression test, falling ball impact value, compression strength, bending strength, bending fracture point displacement, and recyclability for the expanded molded articles of these examples and comparative examples are shown in Tables 11 and 12.

PE, HDPE, LLDPE, PS, and MB mean polyethylene-based resin, high-density polyethylene-based resin (first polyethylene-based resin), linear low-density polyethylene-based resin (second polyethylene-based resin), polystyrene, and master batch respectively.

TABLE 8

| | | Resin No. | Density kg/m³ | MFR g/10 min | Melting Point ° C. | Mz $\times 10^3$ | Mw $\times 10^3$ | Mn $\times 10^3$ | Mz/Mn | Mw/Mn | Crystallization Calorific Value mJ/mg | TREF No. of peaks |
|---|---|---|---|---|---|---|---|---|---|---|---|---|
| First PE HDPE | PE synthesized in Example 1b | 1 | 937 | 8.0 | 124 | 788 | 162 | 31 | 25.4 | 5.2 | 183 | 2 |
| | TOSOH-HMS grade name: 10S65B manufactured by Tosoh Corporation | 2 | 940 | 2.0 | 126 | 1,040 | 233 | 48 | 21.7 | 4.8 | 172 | 2 |
| | TOSOH-HMS grade name: CK57 manufactured by Tosoh Corporation | 3 | 950 | 4.0 | 126 | 1,215 | 219 | 26 | 46.6 | 8.3 | 189 | 2 |
| | TOSOH-HMS grade name: 09S53B manufactured by Tosoh Corporation | 4 | 936 | 2.6 | 123 | 1,142 | 205 | 29 | 39.4 | 7.1 | 169 | 2 |
| | Evolue H SP3510 manufactured by Prime Polymer Co., Ltd. | 5 | 934 | 0.5 | 126 | 674 | 254 | 58 | 11.6 | 4.4 | 156 | 1 |
| Second PE LLDPE | HARMOREX NF444A manufactured by Japan Polyethylene Corporation | A | 912 | 2.0 | 121 | 357 | 191 | 75 | 4.7 | 2.5 | 116 | — |
| | KERNEL KF270 manufactured by Japan Polyethylene Corporation | B | 907 | 2.0 | 100 | 323 | 187 | 84 | 3.8 | 2.2 | 85 | — |

TABLE 9

| | | | | Examples | | | | | | | | | Comparative Examples | |
|---|---|---|---|---|---|---|---|---|---|---|---|---|---|---|
| | | | | 1b | 2b | 3b | 4b | 5b | 6b | 7b | 8b | 9b | 1b | 2b |
| | | HDPE/LLDPE ratio | | 80/20 | 80/20 | 70/30 | 70/30 | 60/40 | 60/40 | 50/50 | 40/60 | 30/70 | 100/0 | 100/0 |
| | | Seed particles/PS ratio | | 4/6 | 4/6 | 4/6 | 4/6 | 4/6 | 4/6 | 4/6 | 4/6 | 4/6 | 4/6 | 4/6 |
| Seed Particles | HDPE | Resin No. 1 | pbm | 100 | 100 | 0 | 0 | 0 | 0 | 0 | 0 | 0 | 100 | 0 |
| | | Resin No. 2 | pbm | 0 | 0 | 100 | 100 | 100 | 100 | 100 | 0 | 100 | 0 | 100 |
| | | Resin No. 3 | pbm | 0 | 0 | 0 | 0 | 0 | 0 | 0 | 100 | 0 | 0 | 0 |
| | | Resin No. 5 | pbm | 0 | 0 | 0 | 0 | 0 | 0 | 0 | 0 | 0 | 0 | 0 |
| | LLDPE | Resin No. A | pbm | 25 | 25 | 43 | 43 | 67 | 67 | 0 | 0 | 0 | 0 | 0 |
| | | Resin No. B | pbm | 0 | 0 | 0 | 0 | 0 | 0 | 100 | 150 | 233 | 0 | 0 |
| | | Carbon black MB | pbm | 0 | 0 | 15.7 | 15.7 | 18.3 | 18.3 | 22 | 27.5 | 0 | 0 | 11 |
| Composite Resin Particles | | Seed particles | pbm | 100 | 100 | 100 | 100 | 100 | 100 | 100 | 100 | 100 | 100 | 100 |
| | | PS | pbm | 150 | 150 | 150 | 150 | 150 | 150 | 150 | 150 | 150 | 150 | 150 |
| | | Gel fraction | wt. % | 0.80 | 0.80 | 0.60 | 0.60 | 0.70 | 0.70 | 1.40 | 1.50 | 1.60 | 0.80 | 0.80 |
| | | Average particle diameter | mm | 1.27 | 1.27 | 1.28 | 1.28 | 1.26 | 1.26 | 1.27 | 1.27 | 1.26 | 1.27 | 1.27 |
| | | Mz | $\times 10^3$ | 740 | 740 | 903 | 903 | 634 | 634 | 710 | 932 | 718 | 887 | 726 |
| | | Mw | $\times 10^3$ | 321 | 321 | 434 | 434 | 298 | 298 | 356 | 422 | 346 | 418 | 307 |
| Expanded Molded Article | | Expansion ratio | Times | 20 | 30 | 20 | 30 | 20 | 30 | 20 | 20 | 20 | 20 | 30 |
| | | Density | kg/m³ | 50.0 | 33.3 | 50.0 | 33.3 | 50.0 | 33.3 | 50.0 | 50.0 | 50.0 | 50.0 | 33.3 |

pbm: parts by mass

TABLE 10

| | | | | Examples | | | | | Comparative Examples | |
|---|---|---|---|---|---|---|---|---|---|---|
| | | | | 10b | 11b | 12b | 13b | 14b | 3b | 4b |
| | | HDPE/LLDPE ratio | | 80/20 | 80/20 | 50/50 | 40/60 | 80/20 | 100/0 | 100/0 |
| | | Core resin/PS ratio | | 3/7 | 3/7 | 3/7 | 3/7 | 3/7 | 3/7 | 3/7 |
| Seed Particles | | Resin No. 2 | pbm | 100 | 100 | 100 | 0 | 0 | 100 | 0 |
| | | Resin No. 4 | pbm | 0 | 0 | 0 | 100 | 100 | 0 | 100 |
| | LLDPE | Resin No. A | pbm | 25 | 25 | 0 | 0 | 25 | 0 | 0 |
| | | Resin No. B | pbm | 0 | 0 | 100 | 150 | 0 | 0 | 0 |
| | | Carbon black MB | pbm | 13.8 | 13.8 | 22 | 27.5 | 13.8 | 11 | 11 |
| Composite Resin | | Seed particles | pbm | 100 | 100 | 100 | 100 | 100 | 100 | 100 |
| | | PS | pbm | 233 | 233 | 233 | 233 | 233 | 233 | 233 |

TABLE 10-continued

| | | | Examples | | | | | Comparative Examples | |
|---|---|---|---|---|---|---|---|---|---|
| | | | 10b | 11b | 12b | 13b | 14b | 3b | 4b |
| Particles | Gel fraction | wt. % | 0.60 | 0.60 | 1.60 | 1.30 | 0.80 | 0.60 | 0.60 |
| | Average particle diameter | mm | 1.30 | 1.30 | 1.31 | 1.30 | 1.29 | 1.30 | 1.30 |
| | Mz | $\times 10^3$ | 932 | 932 | 712 | 712 | 635 | 720 | 901 |
| | Mw | $\times 10^3$ | 422 | 422 | 358 | 358 | 299 | 348 | 433 |
| Expanded | Expansion Ratio | Times | 20 | 30 | 20 | 20 | 30 | 20 | 30 |
| Molded Article | Density | kg/m$^3$ | 50.0 | 33.3 | 50.0 | 50.0 | 33.3 | 50.0 | 33.3 |

pbm: parts by mass

TABLE 11

| | | | | Examples | | | | | |
|---|---|---|---|---|---|---|---|---|---|
| | | | | 1b | 2b | 3b | 4b | 5b | 6b |
| Temperature Dependence | Generated Load at 50% Compression | −35° C. $Q_{-35}$ | N | 546 | 307 | 496 | 252 | 552 | 244 |
| | | 23° C. $Q_{23}$ | N | 457 | 291 | 438 | 238 | 488 | 225 |
| | | 65° C. $Q_{65}$ | N | 406 | 246 | 374 | 209 | 406 | 188 |
| | | $Q_{-35}/Q_{23}$ | Ratio/Evaluation | 1.19/○ | 1.05/○ | 1.13/○ | 1.06/○ | 1.13/○ | 1.08/○ |
| | | $Q_{65}/Q_{23}$ | Ratio/Evaluation | 0.89/○ | 0.85/○ | 0.85/○ | 0.88/○ | 0.83/○ | 0.84/○ |
| | Absorption Energy at 50% Compression | −35° C. $E_{-35}$ | J | 8.13 | 4.29 | 7.10 | 3.47 | 8.36 | 3.50 |
| | | 23° C. $E_{23}$ | J | 6.81 | 4.00 | 6.16 | 3.22 | 7.12 | 3.18 |
| | | 65° C. $E_{65}$ | J | 6.05 | 3.31 | 5.24 | 2.85 | 5.87 | 2.57 |
| | | $E_{-35}/E_{23}$ | Ratio/Evaluation | 1.19/○ | 1.07/○ | 1.15/○ | 1.08/○ | 1.17/○ | 1.10/○ |
| | | $E_{65}/E_{23}$ | Ratio/Evaluation | 0.89/○ | 0.83/○ | 0.85/○ | 0.89/○ | 0.82/○ | 0.81/○ |
| Falling Ball Impact Value | | | cm/Evaluation | 46.5/○ | 43.5/○ | 60.5/○ | 55.5/○ | 73.5/○ | 66.5/○ |
| Compression Strength | | | MPa | 0.35 | 0.17 | 0.36 | 0.19 | 0.35 | 0.18 |
| Bending Strength | | | MPa | 0.75 | 0.45 | 0.70 | 0.52 | 0.70 | 0.49 |
| Bending Fraction Point Displacement | | | mm/Evaluation | 30.7/○ | 36.7/○ | 39.1/○ | 55.5/○ | 42.1/○ | 64.4/○ |
| Recyclability | | | Evaluation | ○ | ○ | ○ | ○ | ○ | ○ |

| | | | | Examples | | | Comparative Examples | |
|---|---|---|---|---|---|---|---|---|
| | | | | 7b | 8b | 9b | 1b | 2b |
| Temperature Dependence | Generated Load at 50% Compression | −35° C. $Q_{-35}$ | N | 483 | 431 | 409 | 511 | 327 |
| | | 23° C. $Q_{23}$ | N | 422 | 372 | 353 | 464 | 296 |
| | | 65° C. $Q_{65}$ | N | 356 | 307 | 292 | 412 | 260 |
| | | $Q_{-35}/Q_{23}$ | Ratio/Evaluation | 1.14/○ | 1.16/○ | 1.16/○ | 1.10/○ | 1.10/○ |
| | | $Q_{65}/Q_{23}$ | Ratio/Evaluation | 0.84/○ | 0.83/○ | 0.83/○ | 0.89/○ | 0.88/○ |
| | Absorption Energy at 50% Compression | −35° C. $E_{-35}$ | J | 7.34 | 6.41 | 6.09 | 7.35 | 4.54 |
| | | 23° C. $E_{23}$ | J | 6.31 | 5.32 | 5.06 | 6.59 | 4.13 |
| | | 65° C. $E_{65}$ | J | 5.15 | 4.39 | 4.17 | 5.96 | 3.55 |
| | | $E_{-35}/E_{23}$ | Ratio/Evaluation | 1.16/○ | 1.20/○ | 1.20/○ | 1.12/○ | 1.10/○ |
| | | $E_{65}/E_{23}$ | Ratio/Evaluation | 0.82/○ | 0.83/○ | 0.82/○ | 0.90/○ | 0.86/○ |
| Falling Ball Impact Value | | | cm/Evaluation | 66.5/○ | 68.5/○ | 73.5/○ | 28.5/X | 25.5/X |
| Compression Strength | | | MPa | 0.32 | 0.27 | 0.27 | 0.35 | 0.19 |
| Bending Strength | | | MPa | 0.81 | 0.75 | 0.73 | 0.64 | 0.40 |
| Bending Fraction Point Displacement | | | mm/Evaluation | 32.5/○ | 36.9/○ | 37.9/○ | 14.5/X | 20.1/X |
| Recyclability | | | Evaluation | ○ | ○ | ○ | ○ | ○ |

TABLE 12

| | | | | Examples | | | | | Comparative Examples | |
|---|---|---|---|---|---|---|---|---|---|---|
| | | | | 10b | 11b | 12b | 13b | 14b | 3b | 4b |
| Temperature Dependence | Generated Load at 50% Compression | −35° C. $Q_{-35}$ | N | 518 | 362 | 494 | 469 | 324 | 569 | 325 |
| | | 23° C. $Q_{23}$ | N | 464 | 331 | 469 | 446 | 316 | 503 | 300 |
| | | 65° C. $Q_{65}$ | N | 406 | 269 | 396 | 376 | 283 | 418 | 249 |
| | | $Q_{-35}/Q_{23}$ | Ratio/Evaluation | 1.12/○ | 1.09/○ | 1.05/○ | 1.05/○ | 1.03/○ | 1.13/○ | 1.08/○ |
| | | $Q_{65}/Q_{23}$ | Ratio/Evaluation | 0.88/○ | 0.81/○ | 0.84/○ | 0.84/○ | 0.90/○ | 0.83/○ | 0.83/○ |
| | Absorption Energy at 50% Compression | −35° C. $E_{-35}$ | J | 7.60 | 5.23 | 7.19 | 6.83 | 4.71 | 8.61 | 4.80 |
| | | 23° C. $E_{23}$ | J | 6.74 | 4.71 | 6.79 | 6.45 | 4.59 | 7.33 | 4.22 |
| | | 65° C. $E_{65}$ | J | 5.86 | 3.75 | 5.73 | 5.44 | 3.96 | 6.05 | 3.53 |
| | | $E_{-35}/E_{23}$ | Ratio/Evaluation | 11.3/○ | 1.11/○ | 1.06/○ | 1.06/○ | 1.03/○ | 1.17/○ | 1.14/○ |
| | | $E_{65}/E_{23}$ | Ratio/Evaluation | 0.87/○ | 0.80/○ | 0.84/○ | 0.84/○ | 0.86/○ | 0.83/○ | 0.84/○ |

TABLE 12-continued

| | | Examples | | | | | Comparative Examples | |
|---|---|---|---|---|---|---|---|---|
| | | 10b | 11b | 12b | 13b | 14b | 3b | 4b |
| Falling Ball Impact Value | cm/Evaluation | 52.5/○ | 48.5/○ | 54.5/○ | 54.5/○ | 45.5/○ | 25.5/X | 21.5/X |
| Compression Strength | MPa | 0.37 | 0.21 | 0.32 | 0.30 | 0.21 | 0.35 | 0.22 |
| Bending Strength | MPa | 0.81 | 0.55 | 0.77 | 0.75 | 0.55 | 0.72 | 0.46 |
| Bending Fraction Point Displacement | mm/Evaluation | 37.2/○ | 45.5/○ | 38.3/○ | 42.5/○ | 41.5/○ | 24.3/X | 27.6/X |
| Recyclability | Evaluation | ○ | ○ | ○ | ○ | ○ | ○ | ○ |

The following is understood from Tables 11 and 12.

From the examples, it is understood that composite resin particles including a first polyethylene-based resin having a medium density to a high density in the range of 930 to 950 $kg/m^3$ and a second polyethylene-based resin which is linear and which has a lower density than the first polyethylene-based resin can obtain an expanded molded article having small temperature dependency of mechanical properties and high falling ball impact value, compression strength, bending strength, and bending fraction point displacement.

From the examples and the comparative examples, it is understood that by including a first polyethylene-based resin and a second polyethylene-based resin in the ranges of 90 to 30% by mass and 10 to 70% by mass respectively, with respect to the total of these resins, an expanded molded article having small temperature dependency of mechanical properties and high falling ball impact value, compression strength, bending strength, and bending fraction point displacement can be obtained.

EXPLANATION OF SYMBOLS

1: Tap tip
2: Compression test flat plate (upper side)
3: Compression test flat plate (lower side)
4: Support
5: Test piece
6: Tap

What is claimed is:

1. Composite resin particles comprising: a polyethylene-based resin and a polystyrene-based resin, wherein said polyethylene-based resin and said polystyrene-based resin are included in ranges of 50 to 20% by mass and 50 to 80% by mass respectively, with respect to the total of these resins, said polyethylene-based resin is composed of: a first polyethylene-based resin having a medium density to a high density in a range of 925 to 965 $kg/m^3$; and a second polyethylene-based resin which is linear and which has a lower density than said first polyethylene-based resin, said first polyethylene-based resin and said second polyethylene-based resin are included in ranges of 90 to 30% by mass and 10 to 70% by mass respectively, with respect to the total of these resins, and said composite resin particles are particles in which a gel fraction is less than 5% by weight.

2. The composite resin particles according to claim 1, wherein said second polyethylene-based resin has a density of 15 $kg/m^3$ or more lower than the density of said first polyethylene-based resin.

3. The composite resin particles according to claim 1, wherein said first polyethylene-based resin has a crystallization calorific value of 140 mJ/mg or more and said second polyethylene-based resin has a crystallization calorific value of 120 mJ/mg or less.

4. The composite resin particles according to claim 1, wherein said composite resin particles have an average particle diameter of 1.0 to 2.0 mm.

5. The composite resin particles according to claim 1, wherein said first polyethylene-based resin is provided with two or more peaks in an elution temperature-elution amount curve by continuous temperature rising elution fractionation (TREF).

6. Composite resin particles comprising: a polyethylene-based resin and a polystyrene-based resin, wherein said polyethylene-based resin and said polystyrene-based resin are included in ranges of 50 to 20% by mass and 50 to 80% by mass respectively, with respect to the total of these resins, said polyethylene-based resin is composed of: a first polyethylene-based resin having a medium density to a high density in a range of 925 to 965 $kg/m^3$, and a second polyethylene-based resin which is linear and which has a lower density than said first polyethylene-based resin, said first polyethylene-based resin and said second polyethylene-based resin are included in ranges of 90 to 30% by mass and 10 to 70% by mass respectively, with respect to the total of these resins, and said composite resin particles further include carbon black in a range of 0.5 to 2.5% by mass.

7. The composite resin particles according to claim 6, wherein said composite resin particles are particles in which a gel fraction is less than 5% by weight.

8. The composite resin particles according to claim 1, wherein said composite resin particles are obtained by impregnating a styrene-based monomer into seed particles formed from a polyethylene-based resin and polymerizing.

9. Composite resin particles comprising:

a polyethylene-based resin and a polystyrene-based resin, wherein said polyethylene-based resin and said polystyrene-based resin are included in ranges of 50 to 20% by mass and 50 to 80% by mass respectively, with respect to the total of these resins, said polyethylene-based resin is composed of: a first polyethylene-based resin having a medium density to a high density in a range of 930 to 950 $kg/m^3$; and a second polyethylene-based resin which is linear and which has a lower density than said first polyethylene-based resin, said first polyethylene-based resin and said second polyethylene-based resin are included in ranges of 90 to 30% by mass and 10 to 70% by mass respectively, with respect to the total of these resins, and said first polyethylene-based resin, in terms of polystyrene, has a number-average molecular weight Mn in a range of 25,000 to 50,000, a Z-average molecular weight Mz in a range of 700,000 to 1,300,000, and Mz/Mn in a range of 20 to 50.

10. The composite resin particles according to claim 9, wherein said first polyethylene-based resin, in terms of polystyrene, has a weight-average molecular weight Mw in the range of 150,000 to 250,000 and Mw/Mn in a range of 4.5 to 9.0.

11. The composite resin particles according to claim 9, wherein said polystyrene-based resin has a Z-average molecular weight Mz in a range of 600,000 to 1,000,000.

12. The composite resin particles according to claim 9, wherein said polystyrene-based resin has a weight-average molecular weight Mw in a range of 250,000 to 450,000.

13. Expandable particles comprising the composite resin particles according to claim 1 and a physical blowing agent.

14. Pre-expanded particles obtained by pre-expanding the expandable particles according to claim 13.

15. The pre-expanded particles according to claim 13, wherein said polystyrene-based resin has a Z-average molecular weight Mz in a range of 600,000 to 1,000,000.

16. The pre-expanded particles according to claim 15, wherein said polystyrene-based resin has a weight-average molecular weight Mw in a range of 250,000 to 450,000.

17. An expanded molded article obtained by in-die expansion molding the pre-expanded particles according to claim 14.

18. The composite resin particles according to claim 2, wherein said first polyethylene-based resin, in terms of polystyrene, has a weight-average molecular weight Mw in the range of 150,000 to 250,000 and Mw/Mn in a range of 4.5 to 9.0.

* * * * *

UNITED STATES PATENT AND TRADEMARK OFFICE

CERTIFICATE OF CORRECTION

PATENT NO. : 9,988,511 B2
APPLICATION NO. : 15/113227
DATED : June 5, 2018
INVENTOR(S) : S. Terasaki et al.

It is certified that error appears in the above-identified patent and that said Letters Patent is hereby corrected as shown below:

In the Claims

At Column 44, Line 33 (Claim 6, Line 9), please change ", and" to -- ; and --.

Signed and Sealed this
Eighteenth Day of December, 2018

Andrei Iancu
*Director of the United States Patent and Trademark Office*